US012808981B2

(12) United States Patent
Kohlleppel et al.

(10) Patent No.: US 12,808,981 B2
(45) Date of Patent: Nov. 24, 2026

(54) APPARATUS AND METHOD FOR DETERMINING A DESIRED LOW-AMPLITUDE SIGNAL COMPONENT OF A RADAR RECEIVE SIGNAL OF A RADAR SENSOR AND RADAR SYSTEM

(71) Applicant: Infineon Technologies AG, Neubiberg (DE)

(72) Inventors: Robert Kohlleppel, Bonn (DE); Saverio Trotta, Munich (DE)

(73) Assignee: Infineon Technologies AG, Neubiberg (DE)

( * ) Notice: Subject to any disclaimer, the term of this patent is extended or adjusted under 35 U.S.C. 154(b) by 238 days.

(21) Appl. No.: 18/605,016

(22) Filed: Mar. 14, 2024

(65) Prior Publication Data

US 2024/0329198 A1 Oct. 3, 2024

(30) Foreign Application Priority Data

Mar. 30, 2023 (EP) .................................... 23165538

(51) Int. Cl.
*G01S 7/35* (2006.01)
*G01S 7/41* (2006.01)

(52) U.S. Cl.
CPC .............. *G01S 7/354* (2013.01); *G01S 7/415* (2013.01)

(58) Field of Classification Search
CPC ................................ G01S 7/354; G01S 7/415
See application file for complete search history.

(56) References Cited

U.S. PATENT DOCUMENTS

| | | | | |
|---|---|---|---|---|
| 2010/0152600 | A1* | 6/2010 | Droitcour | A61B 5/7221 600/534 |
| 2010/0198083 | A1* | 8/2010 | Lin | G01S 13/536 600/484 |
| 2015/0112220 | A1* | 4/2015 | Sana | A61B 5/05 600/534 |
| 2017/0042432 | A1* | 2/2017 | Adib | G01S 13/536 |
| 2018/0263502 | A1* | 9/2018 | Lin | G01S 7/415 |

FOREIGN PATENT DOCUMENTS

| | | |
|---|---|---|
| CN | 114642418 A | 6/2022 |
| WO | 2016057781 A1 | 4/2016 |

OTHER PUBLICATIONS

Morgan, Dennis R., et al., “Novel signal processing techniques for Doppler radar cardiopulmonary sensing”, Elsevier, Signal Processing 89 (2009) 45-56, Jul. 22, 2008, journal. homepage: www.elsevier.com/locate/sigpro.

* cited by examiner

*Primary Examiner* — Vladimir Magloire
*Assistant Examiner* — Hailey R Le
(74) *Attorney, Agent, or Firm* — Slater Matsil, LLP

(57) ABSTRACT

In accordance with an embodiment, a method includes: determining, based on a phase and a magnitude of complex samples of a radar receive signal, an undesired high-amplitude signal component of the radar receive signal representing an interfering motion of a target in a field of view of a radar sensor; determining a residual signal based on the undesired high-amplitude signal component and the radar receive signal; and determining a desired low-amplitude signal component of the radar receive signal representing at least one of a target motion or an electromagnetic field of the target based on the residual signal.

20 Claims, 16 Drawing Sheets

100

400

APPARATUS AND METHOD FOR DETERMINING A DESIRED LOW-AMPLITUDE SIGNAL COMPONENT OF A RADAR RECEIVE SIGNAL OF A RADAR SENSOR AND RADAR SYSTEM

This application claims the benefit of European Patent Application No. 23165538, filed on Mar. 30, 2023, which application is hereby incorporated herein by reference.

TECHNICAL FIELD

The present disclosure relates to radar signal processing. Examples relate to an apparatus for determining a desired low-amplitude signal component of a radar receive signal of a radar sensor, a radar system and a method for determining a desired low-amplitude signal component of a radar receive signal of a radar sensor.

BACKGROUND

A low-amplitude signal component of a radar receive signal may be subject to interference from a high-amplitude signal component of the radar receive signal. The low-amplitude signal component may be overlaid such that the detection of said signal component is significantly compromised. Hence, there may be a demand for improved radar signal processing.

SUMMARY

Some aspects of the present disclosure relate to an apparatus for determining a desired low-amplitude signal component of a radar receive signal of a radar sensor, comprising processing circuitry configured to determine, based on a phase and a magnitude of complex samples of the radar receive signal, an undesired high-amplitude signal component of the radar receive signal representing an interfering motion of a target in a field of view of the radar sensor, determine a residual signal based on the undesired high-amplitude signal component and the radar receive signal, and determine the desired low-amplitude signal component of the radar receive signal representing at least one of a target motion and an electromagnetic field of the target based on the residual signal.

Some aspects of the present disclosure relate to a radar system, comprising the above apparatus, and the radar sensor, wherein the radar sensor is configured to generate the radar receive signal by emitting a radar emit signal to the field of view of the radar sensor and receiving a reflection of the radar emit signal.

Some aspects of the present disclosure relate to a computer-implemented method for determining a desired low-amplitude signal component of a radar receive signal of a radar sensor, comprising determining, based on a phase and a magnitude of complex samples of the radar receive signal, an undesired high-amplitude signal component of the radar receive signal representing an interfering motion of a target in a field of view of the radar sensor, determining a residual signal based on the undesired high-amplitude signal component in the radar receive signal, and determining the desired low-amplitude signal component of the radar receive signal representing at least one of a target motion and an electromagnetic field of the target based on the residual signal.

BRIEF DESCRIPTION OF THE DRAWINGS

Some examples of apparatuses and/or methods will be described in the following by way of example only, and with reference to the accompanying figures, in which.

DETAILED DESCRIPTION OF THE EMBODIMENTS

Figure 1:
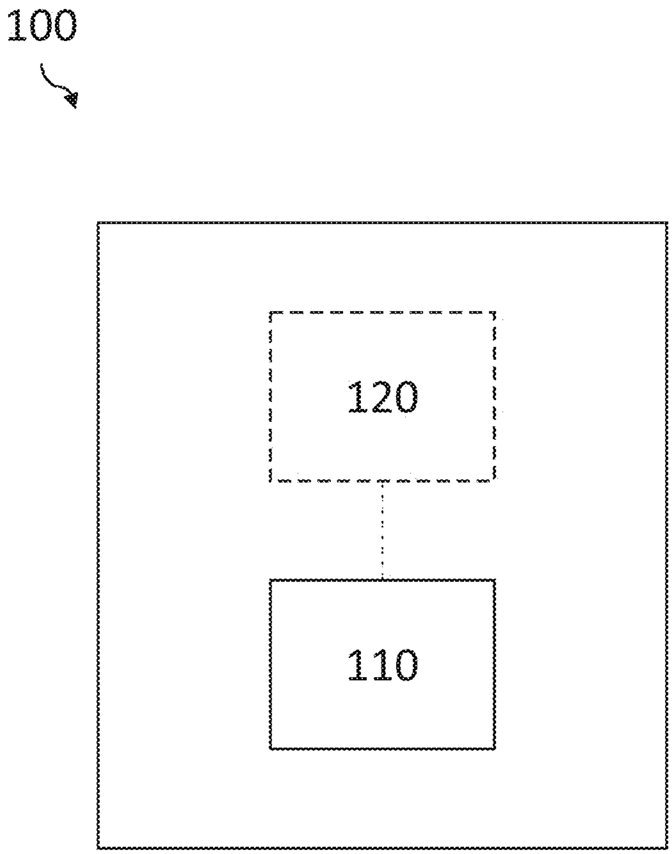
FIG. 1 illustrates an example of an apparatus for determining a desired low-amplitude signal component of a radar receive signal of a radar sensor.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates a block diagram of an example of an apparatus 100 for determining a desired low-amplitude signal component of a radar receive signal of a radar sensor. For instance, the apparatus 100 may be integrated into a radar system comprising a radar sensor such as explained below with reference to FIG. 9 or may be external to the radar system. In the former case, the apparatus 100 may be external to or (e.g., partially or fully) integrated into the radar sensor. In some applications, the apparatus may be implemented as an embedded device.

The apparatus 100 comprises processing circuitry 110 and, optionally, interface circuitry 120. In case interface circuitry 120 is present, the interface circuitry 120 may be communicatively coupled (e.g., via a wired or wireless connection) to the processing circuitry 110, e.g., for data exchange between the interface circuitry 120 and the processing circuitry 110.

The interface circuitry 120 may be any device or means for communicating or exchanging data. In case the apparatus 100 comprises the interface circuitry 120, the interface circuitry 120 may be configured to receive data indicating a radar receive signal of the radar sensor. For instance, the interface circuitry 120 may be communicatively coupled to the radar sensor or to a storage device storing the data. The interface circuitry 120 may receive the data, e.g., via a wired or wireless coupling to the radar sensor or the storage device.

Depending on the specific implementation, the apparatus 100 may dispense with the interface circuitry 120: For example, the processing circuitry 110 may determine said data. For instance, the processing circuitry 110 may be integrated into the radar sensor and perform further processing of the data within the radar sensor. The processing circuitry may determine the data, e.g., by sampling the radar receive signal and optionally modifying the sampled receive signal in a pre-processing step, e.g., for noise-reduction, DC-removal (direct current) or alike. For instance, the apparatus 100 may comprise memory configured to store the determined data.

Alternatively, the processing circuitry 110 may partially determine the data. For instance, the processing circuitry 110 may determine a first part of the data, whereas at least one external processing circuitry may determine at least one second part of the data. The processing circuitry 110 and the external processing circuitry may, e.g., be connected within a distributed computing environment for jointly determining the data. In this case, the processing circuitry may either be integrated into the radar sensor or may be external to the radar sensor. The processing circuitry 110 may receive the second part of the data, e.g., via an interface to the external processing circuitry such as interface circuitry 120, and further process the first and the second part of the data, as described below.

In another alternative, the processing circuitry 110 is partially integrated into the radar sensor and is partially external to the radar sensor. In such cases, the interface circuitry 120 is optional. The processing circuitry 110 may, for instance, comprise a first part (first processing circuitry) which is integrated into the radar sensor and a second part (second processing circuitry) which is external to the radar sensor. In this case, the determination of the data and/or further processing, as described below, may be performed by the first and second part of the processing circuitry 110 in a distributed manner.

The processing circuitry 110 may be, e.g., a single dedicated processor, a single shared processor, or a plurality of individual processors, some of which or all of which may be shared, a digital signal processor (DSP) hardware, an application specific integrated circuit (ASIC), a microcontroller or a field programmable gate array (FPGA). The processing circuitry 110 may optionally be coupled to, e.g., read only memory (ROM) for storing software, random access memory (RAM), non-volatile memory and/or other types of non-transitory computer readable media.

The radar receive signal may be any signal which is generated by the radar sensor. For instance, the radar sensor may generate the radar receive signal by emitting a radar emit signal to a field of view of the radar sensor and receiving a reflection of the radar emit signal. The processing circuitry 110 may process data indicating the radar receive signal. For instance, the data may encode or represent the radar receive signal or a modified (e.g., noise-reduced or DC-removed) version thereof, e.g., modified in an upstream processing step performed by processing circuitry external to or integrated into the apparatus 100 (e.g., the processing circuitry 110). For instance, the data may be or may be based on "raw data", e.g., an intermediate frequency (IF) signal or slow-time signal, of the radar sensor. Depending on upstream preprocessing, the data may, for instance, indicate a time-domain, a frequency-domain or a pulse-compressed version of the radar receive signal.

For instance, an example of preprocessing of the radar receive signal performed by the processing circuitry 110 or an external processing circuitry may include determining a range representation of an IF signal based on the radar receive signal, e.g., by applying a fast Fourier transform (FFT) to the IF signal. The range representation may be a data structure arranging multiple chirps of the radar receive signal in range bins. Further, the preprocessing may further include pre-selecting range bins of interest from the range representation, e.g., range bins which are considered including a target. The preprocessing may further include general filtering techniques, e.g., for clutter rejection or alike.

The processing circuitry 110 is configured to determine, based on a phase and a magnitude of complex samples of the radar receive signal, an undesired high-amplitude signal component of the radar receive signal representing an interfering motion of a target in a field of view of the radar sensor.

The complex samples of the radar receive signal may be any complex, thus, two-dimensional, representation of the radar receive signal, i.e., they have each a real and an imaginary component. The complex samples of the radar receive signal may refer to the individual values of the real and imaginary components of the radar receive signal that are sampled over time. For instance, the complex samples may be the result of any complex sampling (e.g., IQ-sampling) applied to the radar receive signal and/or of a complex processing of the radar receive signal. In the latter case, the radar receive signal may be split up into two dimensions, e.g., indicating a phase and a magnitude (or amplitude) of the radar receive signal, respectively.

The interfering motion may be any motion in the field of view of the radar sensor underlying (causing) the high-amplitude signal component. For instance, the interfering motion may have a more pronounced effect on the radar receive signal than a target motion of a target and/or an electromagnetic field to be determined in the field of view of the radar sensor underlying (causing) the desired low-amplitude signal component. In case of the target motion, this more pronounced effect may be due to, e.g., a higher velocity or range of motion of the interfering motion compared to the target motion. The high-amplitude signal component may be any signal component of the radar receive signal which has a (significantly) higher amplitude, signal strength or intensity than the desired low-amplitude signal component which is to be determined. For instance, an average, an integral or a peak of the high-amplitude signal component may be at least two, five, ten, twenty or two hundred times higher than that of the low-amplitude signal component.

The interfering motion and the target motion and/or the electromagnetic field may be detected at a similar range (distance) from the radar sensor. For instance, the interfering motion and the target motion and/or the electromagnetic field may originate from the same target, e.g., a body of a living being (e.g., human). For example, the interfering motion may be a breathing motion of the target. The at least one of the target motion and the electromagnetic field may, in some examples, indicate (i.e. correspond to) a heart beat of the target. In an embodiment, the heart beat is indicated solely by the target motion, and not via the electromagnetic field. In other words, in this case, the desired low-amplitude signal component results from the mechanical motion of the heart of the target. In another embodiment, the heart beat is indicated solely by the electromagnetic field. In other words, in such a scenario, the desired low-amplitude signal component results from the electromagnetic activity generated by the heart of the target. In another embodiment, the heart beat is indicated by both the target motion and the electromagnetic field.

An example of a target application of the apparatus 100 would be a radar-based detection of a heart beat and, optionally, an estimation of the heart rate. Additionally, the target application may require a radar-based detection of breathing and estimation of the breathing rate. In such a target application, it may be challenging to determine the heart beat and, e.g., extract the heart rate, based on the radar receive signal in the presence of breathing. This may be due to a merely indirect measurement of the heart beat signal since the radar sensor may sense not the heart motion itself, but tiny vibrations on the skin since the radar radiation (millimeter-wave) does not penetrate the body. Further, the heart beat signal is very weak compared to breathing and it will be overlaid by the much stronger breathing harmonics. The largest part of the skin motion may, thus, be due to breathing.

The radar receive signal may be modelled as the return (reflection) of the transmit signal from the target, e.g. the chest's skin surface. A total displacement of the target may be the result of combining (e.g., adding up) the chest movement due to breathing and heartbeat. However, conventional approaches may solely focus on the phase of the radar receive signal for modelling and extracting the breathing motion in the radar receive signal. By contrast, the apparatus 100 may take the phase and the magnitude of the complex samples into consideration for determining the undesired high-amplitude signal component. This may allow a precise determination of the undesired high-amplitude signal component and, thus, may enable an extraction of the low-amplitude signal component.

Further, such a holistic approach may enable improved signal models to be used for modelling the radar receive signal and the interfering motion (or the resulting undesired high-amplitude signal component). Conventional approaches may use a signal model which is only valid when the radar sensor has an extremely narrow field of view or is able to form extremely narrow radar beams while maintaining a sufficient signal-to-noise ratio (SNR). If these conditions are not fulfilled, then the heart beat induced chest motion may be greatly diluted in the recovered displacement. In addition, non-existing frequency components might appear in the spectrum of the radar receive signal. Strong filtering of the recovered displacement signal and tracking of the heart rate may alleviate these problems, but may also lead to false values and slow reaction to heart rate changes. Other conventional approaches may require a multichannel radar that is capable of resolving returns from the chest and the abdomen separately.

Figure 2:
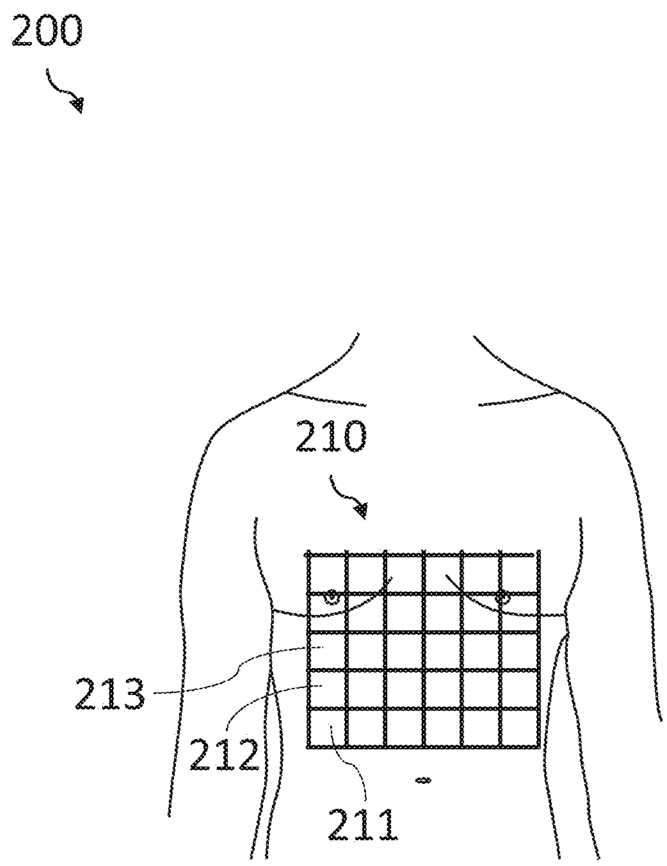
FIG. 2 illustrates an example of a target in a field of view of a radar sensor.

By contrast, an improved signal model of the apparatus 100 may model the radar receive signal (the received signal) as a superposition of many signals from different (respective) parts (or patches) of the target, e.g., of the torso of a human body. In the case of such a multi-patch approach, the processing circuitry 110 may be configured to determine the undesired high-amplitude signal component based on a signal model modelling the undesired high-amplitude signal as a combination of a plurality of signal components of the receive signal received from respective patches of the target. The latter is illustrated by FIG. 2 which shows a schematic representation of an example of a target 200 in a field of view of a radar sensor. In the example of FIG. 2, the target 200 is a human body. A radar receive signal of the radar sensor may be processed (e.g., by range bin selection) such that a resulting signal 210 is focused substantially on the chest and the abdomen of the human body. The resulting signal 210 may be modelled as multiple patches on the human body, such as patches 211, 212, 213. It is to be noted that the patches may be illustrated as rectangular shapes in FIG. 2 for illustrative purposes only. In other examples, the signal model may model the radar receive signal as patches of any shape.

Conventional approaches may need to rely on a single-patch model or may need several radar channels for combining different signals focused on different body parts where the apparatus 100 may get by with only one channel and may still be able to realize a multi-patch approach. An example of a signal model s(t) modelling the radar receive signal is given by Equation 1:

$$s(t) = \sum_{k=0}^{K-1} a_k \exp\left(-j\frac{4\pi}{\lambda}x_k(t)\right) + s_{noise}(t)$$

Equation 1, where, for every patch k, $x_k(t)=x_{b,k}(t)+x_{h,k}(t)$ is a superposition of the displacement due to breathing signal component $x_{b,k}(t)$ and heart beat signal component $x_{h,k}(t)$, $a_k=a_{m,k}e^{j\phi_k}$ is the complex valued amplitude (having magnitude $a_{m,k}$) of the signal components, and $s_{noise}(t)$ is a noise component. The magnitude of the signal components may be determined by the backscattering properties of a respective skin patch, the radar sensor's directivity and its range to the radar sensor. The phase $\phi_k$ of each signal component may correspond to an, e.g., constant, distance offset on x(t).

In the following, further details are given on examples how the undesired high-amplitude signal component may be determined:

In some examples, the processing circuitry 110 is configured to determine the undesired high-amplitude signal component by determining a phase and a magnitude of the undesired high-amplitude signal component based on the phase and the magnitude of the complex samples. That means that a complex-valued signal component is determined which is to model the interfering motion. This may contribute to a more precise modelling of the undesired high-amplitude signal component and to a multi-patch approach as described above which enables modelling a varying amplitude over the multiple patches. The latter may allow the consideration of a varying strength of the interfering motion over the patches, e.g., a varying strength of the breathing motion over different parts of a body.

In the latter case of a multi-patch signal model, the processing circuitry 110 may be configured to determine the undesired high-amplitude signal component by determining a plurality of phases and a plurality of magnitudes of the undesired high-amplitude signal component based on the phase and the magnitude of the complex samples. The plurality of phases and the plurality of magnitudes may correspond to respective patches of the target, e.g., each pair of phases and magnitudes may correspond to a respective patch of the target. For example, the signal model may model the undesired high-amplitude signal component as a combination of at least 3 signal components of the receive signal received from respective patches of the target. This may increase the accuracy of the determination of the high-amplitude signal component.

Regardless of the type of signal model used, the processing circuitry 110 may be configured to determine the undesired high-amplitude signal component by determining at least a first harmonic of the interfering motion based on the complex samples. For instance, the processing circuitry 110 may determine a harmonic spectrum based on the complex samples and identify the first harmonic and optionally further harmonics of the high-amplitude signal component. For instance, the complex valued radar receive (rx) signal may be approximated by a model that is capable of representing the first harmonic of the breath displacements. Thus, the approximated signal may mainly fit the breathing signature. An advantage of the harmonics may be an increased accuracy, improved SNR, and the ability to extract the high-amplitude signal component from very weak radar receive signals.

In some examples, the processing circuitry 110 is configured to determine the undesired high-amplitude signal component by approximating the undesired high-amplitude signal to the phase and the magnitude of the complex samples based on at least one of a predefined span of an amplitude of the displacement of the target, which underlies the undesired high-amplitude signal component of the respective patch, a predefined span of a phase of the underlying displacement and an estimate of an angular frequency of the undesired high-amplitude signal component. For example, the predefined spans of amplitude and phase may cover or be delimited by possible values assumed for the interfering motion. This may depend on known features of the nature of the interfering motion. For example, the breathing motion may be modelled based on assumptions about its periodic pattern. The approximation may for instance, be based on circle fitting, i.e., fitting a circle to a set of data points (the complex samples) of the radar receive signal. For example, this may be done by finding a least square solution for a set of linear equations generated from the given data points.

In case the estimate of the angular frequency is used for determining the high-amplitude signal component, the processing circuitry 110 may be configured to determine the estimate of the angular frequency based on the phase of the complex samples. This may be advantageous when only a single or a few values of the angular frequency shall be processed for reducing processing complexity and time. The processing circuitry 110 may, for instance, match the estimate of the angular frequency to an actual (e.g., breathing) rate of the interfering motion. For instance, the processing circuitry may be configured to determine the estimate of the angular frequency by determining a peak of the phase of the complex samples. For instance, the processing circuitry 110 may determine (compute) a periodogram of the phase (e.g., an unwrapped version of the phase) angle (t) of the complex samples and select a peak within a plausible span (e.g., 10 to 25 breaths per minute in case of a breathing motion) as estimate.

Additionally or alternatively, the processing circuitry 110 may be configured to determine the estimate of the angular frequency based on at least one of a numerical optimization and a cost function using a power of the residual signal as a cost. For instance, the processing circuitry 110 may, in the latter case, be configured to determine the estimate of the angular frequency by minimizing a cost function using the power of the residual signal as the cost. For instance, the processing circuitry 110 may take the latter estimate as initial estimate and perform a numerical search of the estimate for improving its accuracy. For example, the processing circuitry 110 may approximate the radar receive signal by taking the power of the residual as cost. The angular frequency estimate that minimizes the residual power may then be considered the best estimate of the breathing rate.

The determination of the undesired high-amplitude signal component may be based on an approximation to the radar receive signal. For instance, the processing circuitry 110 may be configured to determine the undesired high-amplitude signal component by approximating a signal model of the interfering motion to the phase and the magnitude of the complex samples. The signal model may be the multi-patch signal model as described above and/or any other signal model assumed for the interfering motion. For instance, the signal model may be represented by at least one atom, and the processing circuitry 110 may be configured to approximate the signal model to the complex samples based on the at least one atom. An atom may be understood as a basic element or building block of a dictionary. A dictionary may be defined by a set of atoms, e.g., functions, vectors, equations with differing parameters or alike that may be used to reconstruct the high-amplitude signal component. For instance, the atoms of the dictionary may be wavelet functions which may be characterized by their ability to capture both time-domain and frequency-domain information in a localized way.

For better approximation results, the signal model may be represented by a dictionary of a plurality of atoms, and the processing circuitry 110 may be configured to approximate the signal model to the complex samples by selecting at least one atom of the plurality of atoms. For instance, at least one atom may be selected such that a sparsest representation of the radar receive signal is found, i.e., the representation that uses few or fewest possible functions from the dictionary to represent the radar receive signal. The processing circuitry 110 may further combine (e.g., linearly) the selected atoms for approximating the signal component. The atoms of the dictionary may, e.g., be associated with respective weight values which determine the contribution of the atom to the signal reconstruction. The use of dictionary atoms may be useful, as they can be used to represent the signal component in a computationally efficient way.

The processing circuitry 110 may, for instance, use a breath signal approximation dictionary for approximating signal component due to a breathing motion to the radar receive signal. A foundation of the dictionary may be a signal model for a return (radar receive signal) with a sinusoidal breath displacement, such as given by Equation 2:

$$s_a(t;\, d_b,\, \theta_b,\, \omega_b) = \exp\left(-j\frac{4\pi}{\lambda}d_b\cos(\omega_b t + \theta_b)\right)$$

Equation 2, where $d_b$ is the amplitude of the breath displacement (breathing motion), $\theta_b$ is the phase (shift) of the breathing motion, $\omega_b$ is the angular frequency of the breathing motion. Dictionary atoms may be created for sets of parameters n given by Equation 3:

$$s_{a,n}(t)=s_a(t;d_{b,n},\theta_{b,n},\omega_{b,n}) \quad \text{Equation 3}$$

For simplifying the determination and selection of atoms, the value of $\omega_{b,n}$ may be fixed to $\omega_b$, e.g., obtained from an initial estimate of the breathing rate. Further, the processing circuitry 110 may be configured to determine the plurality of atoms by equally spacing respective amplitude values of the plurality of atoms within a predefined span of an amplitude modulating the undesired high-amplitude signal component. For instance, the values for $\theta_{b,n}$ may be equally spaced between 0 and $2\pi$. In some examples, the processing circuitry 110 is configured to determine the plurality of atoms by equally spacing respective phase values of the plurality of atoms within a predefined span of a phase modulating the undesired high-amplitude signal component. For instance, the values for $d_{b,n}$ may be equally spaced between 0 and a predetermined maximum amplitude assumed for the chest displacement due to breathing. Sampling the signals at times $t_{n_{sample}}$ may yield atom vectors $s_{a,n}$ of length $n_{st}$ (number of slow time samples). These atoms may form a dictionary matrix D with $n_{st}$ rows and $n_{atoms}$ columns. The equal spacing of the atoms may enable an approximation of the undesired signal component having a more consistent representation by homogenously covering the expected value space of the signal component. This may be advantageous in applications where it is desirable to have a predictable output.

A further improvement of the signal approximation may be realized by the processing circuitry 110 being configured to determine the plurality of atoms based on respective parameters for an inhale phase and an exhale phase of the breathing motion. Thus, the inhale phase and the exhale phase may be modelled separately to account for their individual patterns. For instance, an additional dimension may be introduced into the dictionary indicating the breathing phase (inhale or exhale).

The approximation may be realized by any approximation algorithm. For example, the processing circuitry 110 may be configured to approximate the signal model to the complex samples by applying an orthogonal matching pursuit (OMP) to the dictionary. OMP may be a sparse approximation algorithm which may find at least one matching orthogonal projection of multidimensional data indicating the radar receive signal onto a subspace of a span of an over-complete (i.e., redundant) dictionary D. For example, the radar receive signal may be approximately represented as a signal from Hilbert space as a weighted sum of finitely many functions (atoms) taken from D. OMP may be a greedy algorithm for solving the basis pursuit problem, i.e., for decomposing the radar receive signal as a linear combination of orthogonal vectors. OMP may be beneficial because of its ability to handle complex valued signals and its low computational requirements while providing a sufficiently high accuracy in the signal reconstruction. OMP may further help to obtain a residual signal that is cleaned of interferences like those due to breathing. The approximated signal component may be defined by a vector $s_{approx}$. Each value of this vector may correspond to one of the sample times.

Additionally to the above-described atoms, further atoms may be added to the dictionary, e.g. for clutter removal. Further, the dictionary may be modified to obtain a better fit to the breathing displacements, e.g., by introducing additional or more than two parameters into the dictionary.

The processing circuitry 110 is further configured to determine a residual signal based on the undesired high-amplitude signal component and the radar receive signal and determine the desired low-amplitude signal component of the radar receive signal representing the at least one of the target motion and the electromagnetic field of the target based on the residual signal. For example, the processing circuitry 110 may be configured to determine the residual signal by attenuating, removing, subtracting or filtering the undesired high-amplitude signal component in the radar receive signal. The processing circuitry 110 may, for instance, determine a residual signal as the difference between the original radar receive signal and the approximation which substantially rejects the high-amplitude (breathing) signal component. For instance, the residual signal may be represented as a complex-valued vector $r=s-s_{approx}$.

The residual signal may make the low-amplitude (heart beat) signal component more visible. The low-amplitude signal component may be extracted after an optional postprocessing of the residual signal. By using a residual signal derived from a model-based signal approximation, the apparatus 100 may enable an extraction of heart beat signals that are otherwise hidden by much stronger displacements due to breathing (and other sources if included in the model). The field of view of the radar sensor and the range bins may thereby include the entire chest region and abdomen. Thus, no strong focusing may be required for the apparatus 100 to achieve accurate results. An alternative to the chest scenario may be the determination of a heart beat signal component based on a radar receive signal reflected off from a wrist of the target. In the latter case, an interfering motion may be a periodic motion of the arms when the person is walking or other disturbance typically occurring at the wrist. The signal model used for approximation may then be adapted likewise to the wrist-typical interferences.

An example of postprocessing of the residual signal may be the processing circuitry 110 being configured to determine an absolute value or a square of an absolute value of the residual signal and determine the desired low-amplitude signal component based on the absolute value or the square of the absolute value of the residual signal. An example of a postprocessed residual signal is given by Equation 4 where L can for instance take the value 1 or 2:

$$p=\mathrm{abs}(r)^L$$

Equation 4, where the abs operation may be applied element-wise to a vector representing the residual signal.

The residual signal may be the sum of elementary residuals, where each elementary residual may correspond to a component of the original signal received from a respective patch of the target. Each elementary residual may be approximatively proportional to the residual displacement of each component. For example, it may correspond to the displacement of a skin patch minus the first harmonic of the displacement due to the breathing motion. Furthermore, each elementary residual may be modulated by a complex oscillation that is still affected by the breathing motion. The effect of the complex oscillation may be removed by performing the postprocessing, e.g., by using the absolute value or square of the absolute value.

In the following, examples are given of how the low-amplitude signal may be derived:

In some examples, the processing circuitry 110 is configured to determine a phase and a magnitude of the residual signal and determine the desired low-amplitude signal component based on the phase and the magnitude of the residual signal. Since the low-amplitude signal component may be more pronounced in the residual signal, it may be derived by any technique, e.g., by approximating a signal model of the target motion or electromagnetic field to the residual signal.

A possible approach for determining the low-amplitude signal may be the processing of the spectrum or harmonics of the residual signal. This may improve the identification of the low-amplitude signal, especially in case it has a periodic pattern such as a heart beat. For instance, the processing circuitry 110 may be configured to determine the desired low-amplitude signal component by determining at least one peak of a spectrum of the residual signal. The processing circuitry 110 may select one peak which matches the target motion or the electromagnetic field, e.g., based on basic assumptions about them concerning their amplitude, phase or frequency. For example, the processing circuitry 110 may be configured to determine the at least one peak of the spectrum of the residual signal within a predefined frequency span.

The processing circuitry 110 may in the latter case determine (compute) the periodogram (spectrum estimate) of the postprocessed residual. The resulting spectrum may comprise peaks at the heart rate, twice the value of the heart rate and the remaining harmonics of the original breathing rate. Depending on how well the signal reconstruction matched the original signal, these peaks may be of different heights. Therefore, a heart rate extraction strategy may be applied to the periodogram, e.g., the $N_{sel}$ most prominent peaks in a frequency span of interest such as 45 to 220 beats per minute may be extracted. The processing circuitry 110 may determine whether only one or a plurality of peaks are determined in the spectrum of the residual signal, i.e., whether $N_{sel}=1$, then only a single estimate may be sufficient, or whether $N_{sel}>1$. The heart rate extraction strategy may therefore distinguish between the spectrum peak at the heart rate and the second harmonic by extracting those values which are in a plausible heart rate range and are approximately related by a factor of 2.

For improving the plausibility check of the peaks, a tracking algorithm may be used to choose the estimate (peak) which matches or is closest to previous heart rate estimates. The processing circuitry 110 may therefore be configured to, in response to determining a plurality of peaks of the spectrum of the residual signal, determine the desired low-amplitude signal by selecting a peak of the plurality of peaks based on a previously determined desired low-amplitude signal component of the radar receive signal. Regardless of whether peaks in the spectrum or other characteristics of the residual signal are used to derive the low-amplitude signal component, the processing circuitry 110 may be configured to dynamically update the desired low-amplitude signal component by applying a tracking algorithm to the radar receive signal. This may increase the accuracy of the estimation of the low-amplitude signal component and prevent false targets which are caused by, e.g., noise or remaining harmonics of the high-amplitude signal component.

Further, the so far described technique may be applied sequentially to subsequent blocks (e.g., frames) of the residual signal. The processing circuitry 110 may, for example, be configured to determine the low-amplitude signal component by applying a stitching method to the residual signal. The processing circuitry 110 may stitch the residual signal blocks via weighting functions, e.g., such that at each sample time, the weighting functions add up to one. The blocks may be of equal or varying lengths. Any portion of the residual signal may be chosen for heart rate estimation, e.g., a block of the residual signal of the previous 30 seconds or within an interval [−35 seconds, −5 seconds] with respect to the current time. The implementation of a stitching method may enable iterative processing and updating as well as block-wise heart rate (or breathing rate) adaptation.

Figure 3:
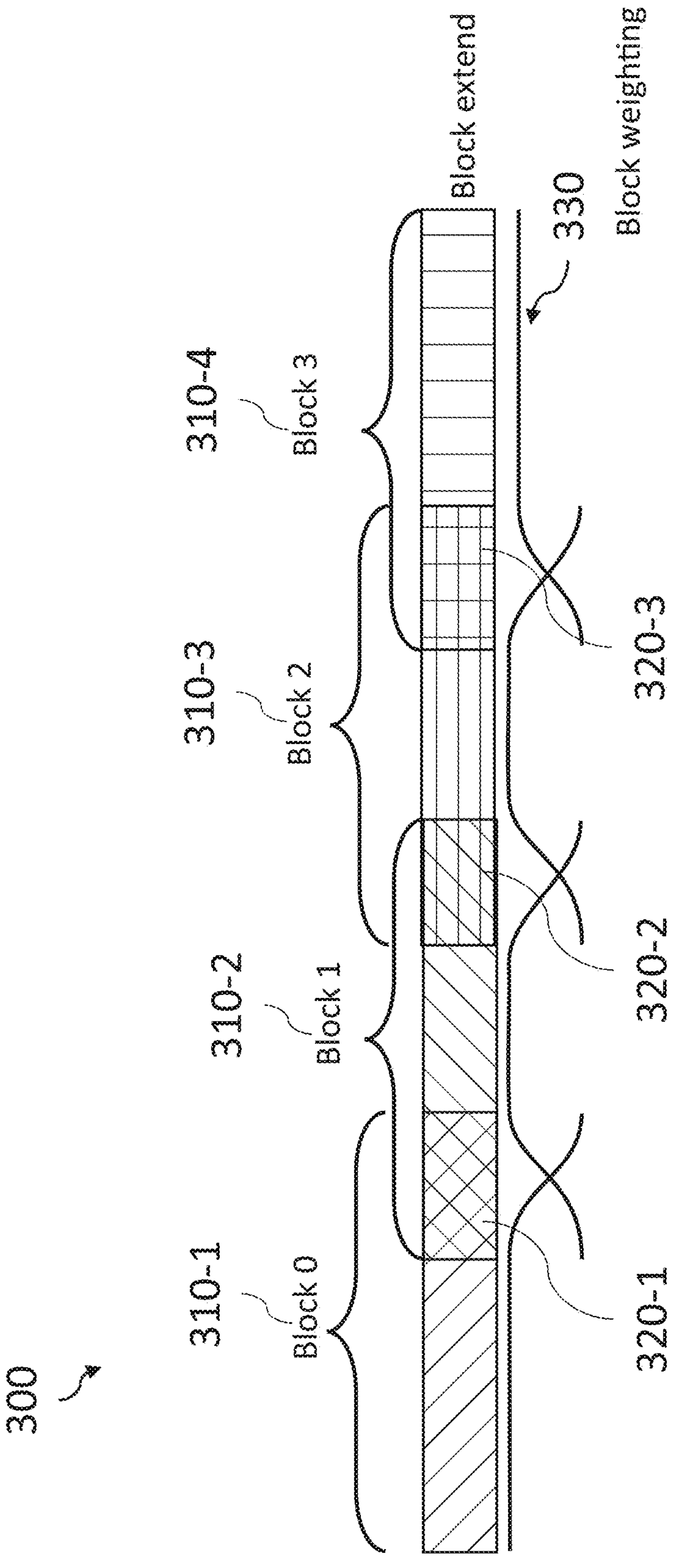
FIG. 3 illustrates an example of a plurality of blocks of a residual signal.

An example of a stitching method is illustrated by FIG. 3. FIG. 3 shows an example of a plurality of blocks 300 of a residual signal, such as blocks 310-1, 310-2, 310-3, 310-4. The blocks 310-1, 310-2, 310-3, 310-4 are partially overlapping, resulting in intersections 320-1, 320-2 and 320-3. FIG. 3 further illustrates an example of a weighting function 330, homogenously weighting the blocks 300. Within an intersection, e.g., intersection 320-1, the respective weights of the affected blocks 310-1 and 310-2 add up to a predefined constant value, e.g. unity.

To prevent errors in the determination of the low-amplitude signal component (e.g. a heartbeat and its associated heart beat rate), a failure strategy may be implemented as follows: The processing circuitry 110 may be further configured to determine an error in the determination of the desired low-amplitude signal component based on at least one of a power of the residual signal, an amplitude of a peak of a spectrum of the residual signal and a deviation of the determined desired low-amplitude signal component from a previously determined desired low-amplitude signal component of the radar receive signal. For example, the processing circuitry 110 may determine the error by determining whether the power of the residual signal exceeds a threshold, by determining whether the peak of the spectrum is sufficiently pronounced for a plausible heart rate, or whether the deviation to the previously determined value exceeds a threshold. Then, the erroneous part (block) of the residual signal or the corresponding determined low-amplitude signal component may be discarded.

An example of an application may be the processing circuitry being configured to determine at least one of a heart rate and a blood pressure of the target based on the desired low-amplitude signal component. In case of the blood pressure measurement, the processing circuitry 110 may extract a pressure wave of the blood from the residual signal, e.g., in addition to the heart rate. The processing circuitry 110 (or the interface circuitry 120) may further be configured to output a signal to a user based on the determined desired low-amplitude signal component. For instance, in case the processing circuitry 110 detects an error (failure), it may report that error to the user and, e.g., may resume outputting the heart rate values to the user once a signal block or a determined heart rate value is considered plausible again.

The FIGS. 4*a*, 4*b*, 5*a*, 5*b*, 6*a*, 6*b*, 7*a*, 7*b*, 8*a*, 8*b* show examples of experimental results of the technique described herein, such as by using apparatus 100, and a comparison to ground truth. The experimental results are based on recordings over 299 seconds with a human in a field of view of an example of a radar sensor with a bandwidth of 5 GHz (Gigahertz) and a single Rx-channel. The experimental results relate to an example of a target application where the heart rate of the human is to be measured from chest movements in presence of breathing motions.

Figure 4A:
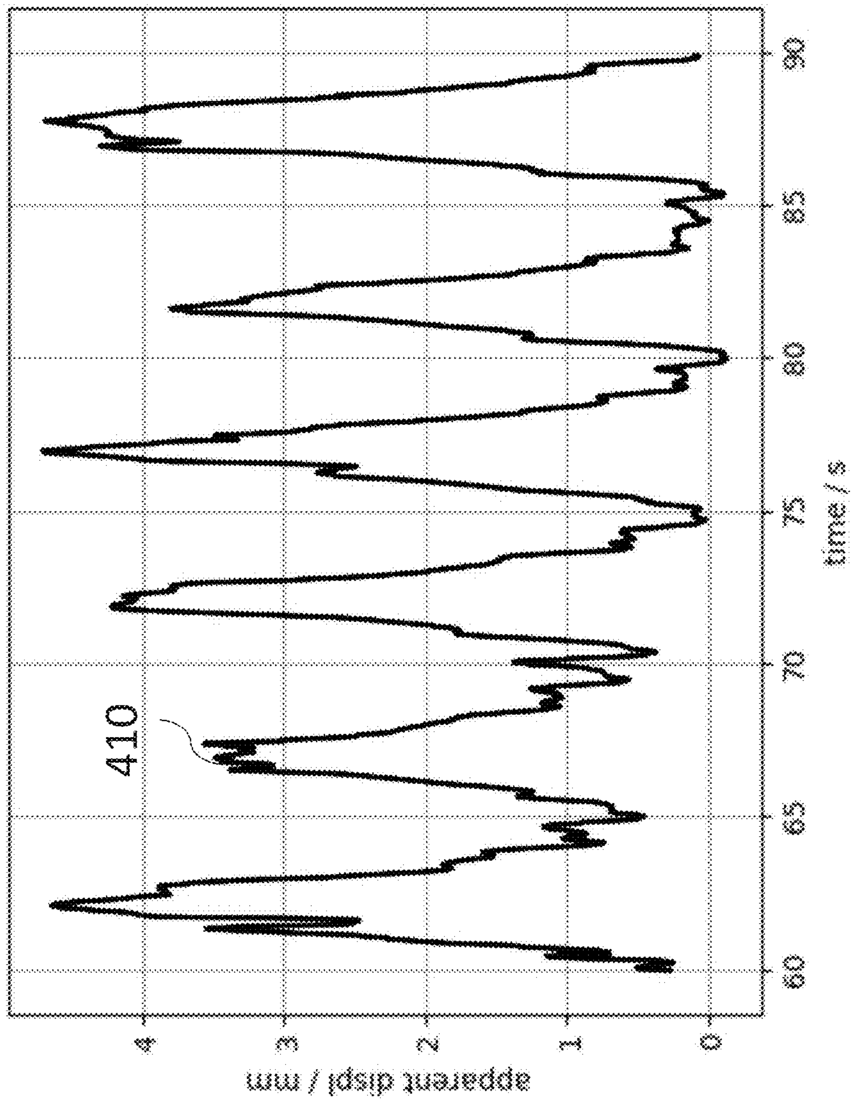
FIG. 4*a* and FIG. 4*b* illustrate examples of a diagram of an apparent displacement derived from a radar receive signal.
Figure 4B:
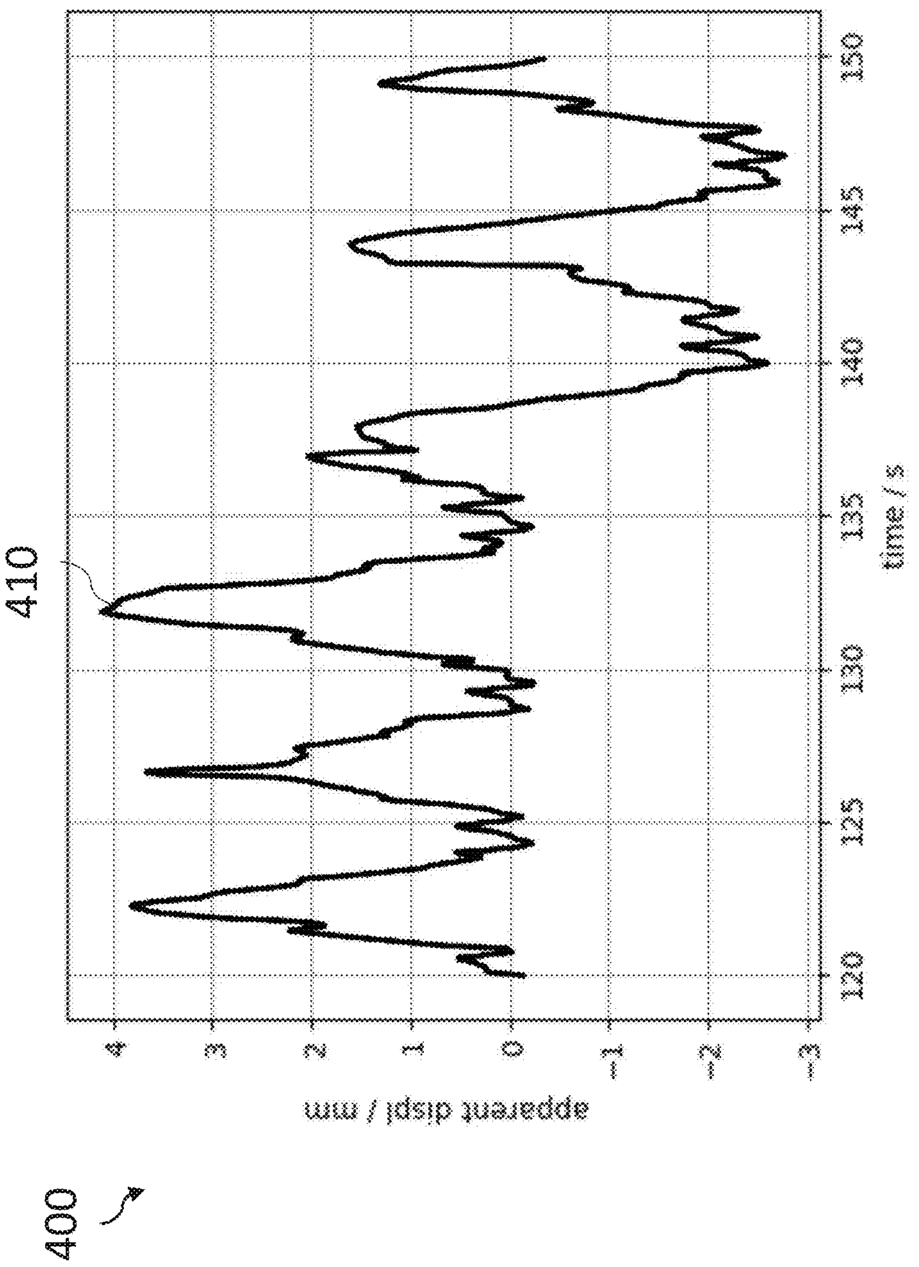

FIG. 4*a* and FIG. 4*b* illustrate examples of a diagram 400 of an apparent displacement 410 derived from a radar receive signal of the radar sensor over the time intervals 60 to 90 seconds and 120 to 150 seconds, respectively. The apparent displacement 410 exhibits a periodic pattern which is mainly due to breathing.

Figure 5A:
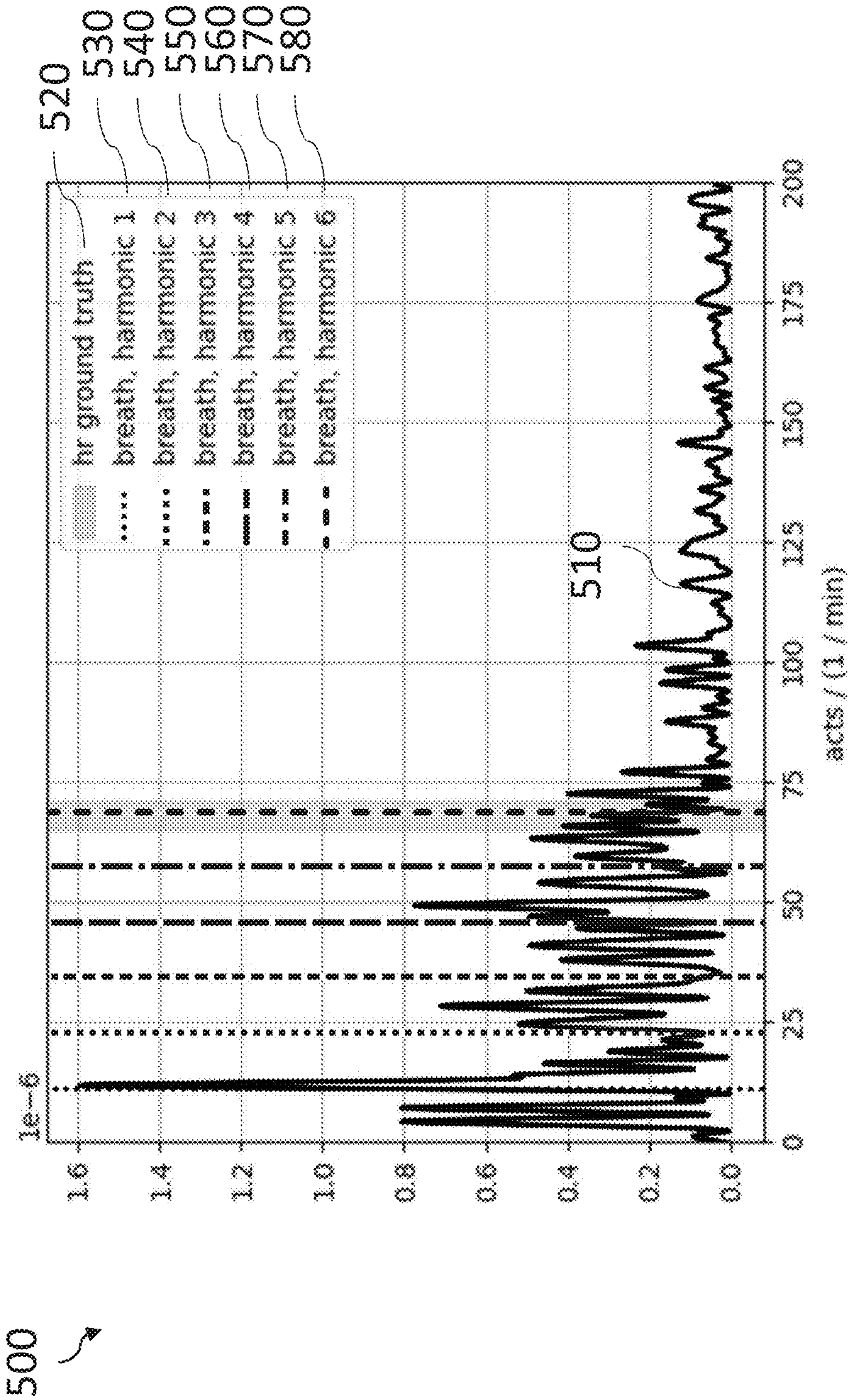
FIG. 5*a* and FIG. 5*b* illustrate examples of a periodogram of an apparent displacement derived from a radar receive signal.
Figure 5B:
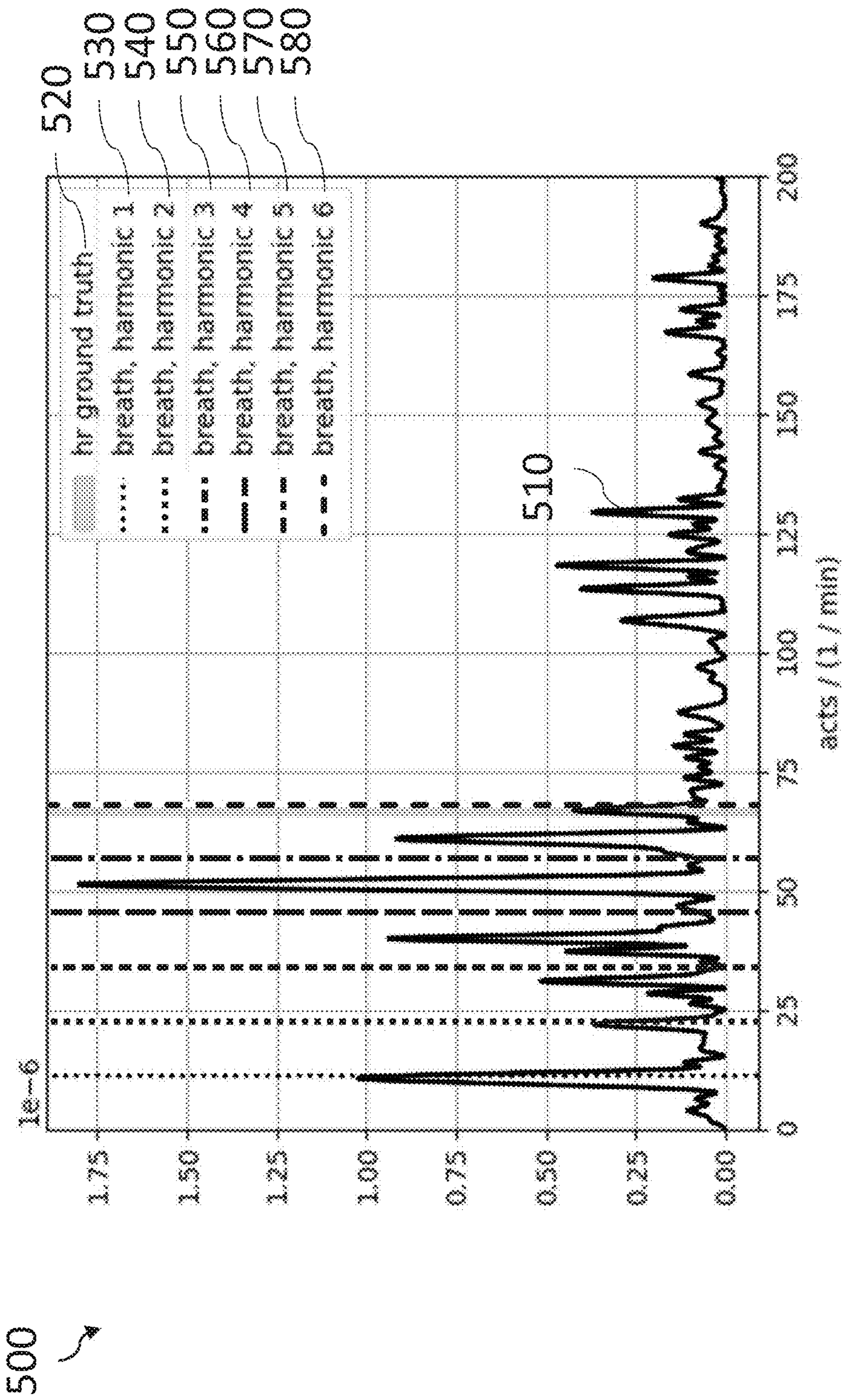

FIG. 5*a* and FIG. 5*b* illustrate examples of a diagram 500 including a periodogram 510 of the apparent displacement 410 of FIG. 4*a* and FIG. 4*b*, respectively. In the diagram 500, the first to sixth breath harmonics 530 to 580 are marked as well as ground truth of the heart rate 520 of the human. It becomes apparent that the heart rate 520 causes a much less pronounced peak in the periodogram 510 compared to other peaks.

Figure 6A:
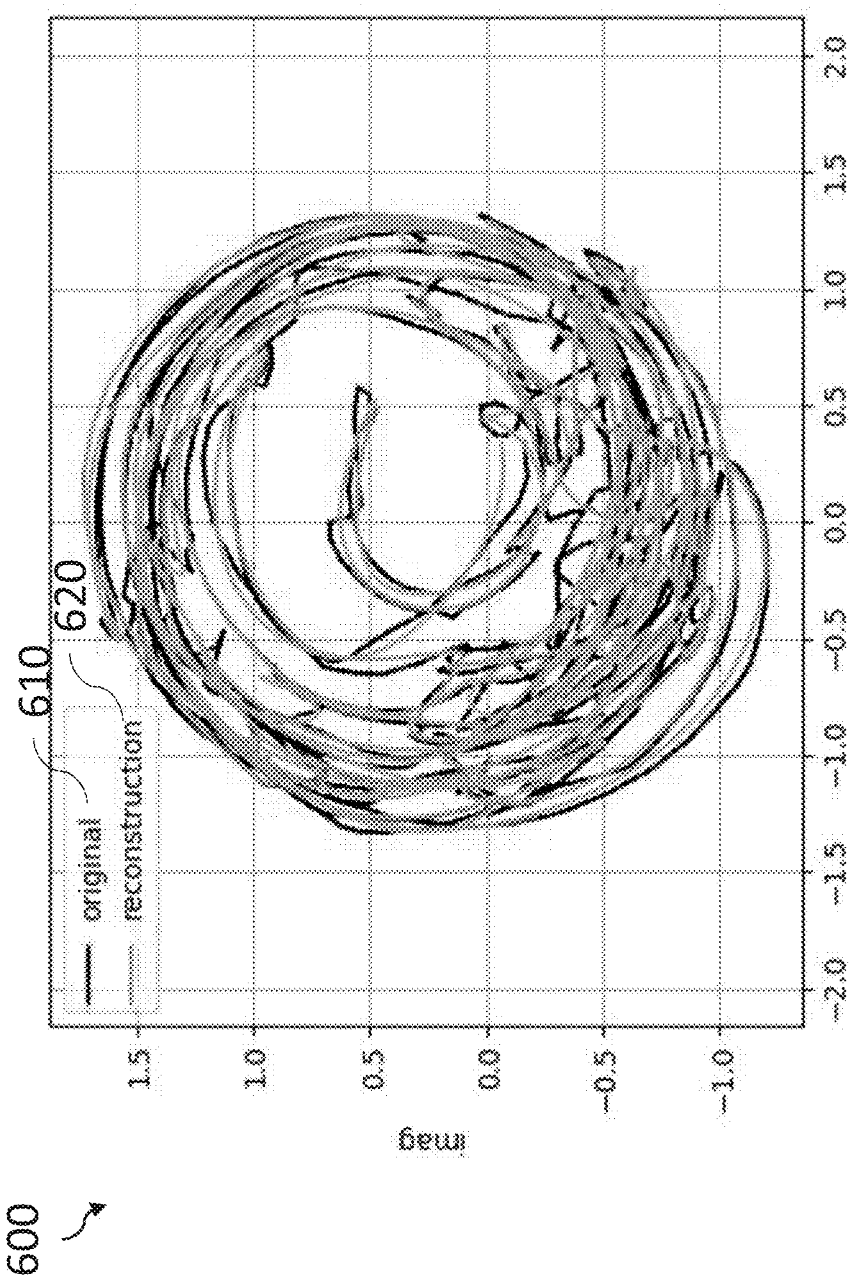
FIG. 6*a* and FIG. 6*b* illustrate examples of a polar representation of complex samples of the radar receive signal and an approximation of the radar receive signal.
Figure 6B:
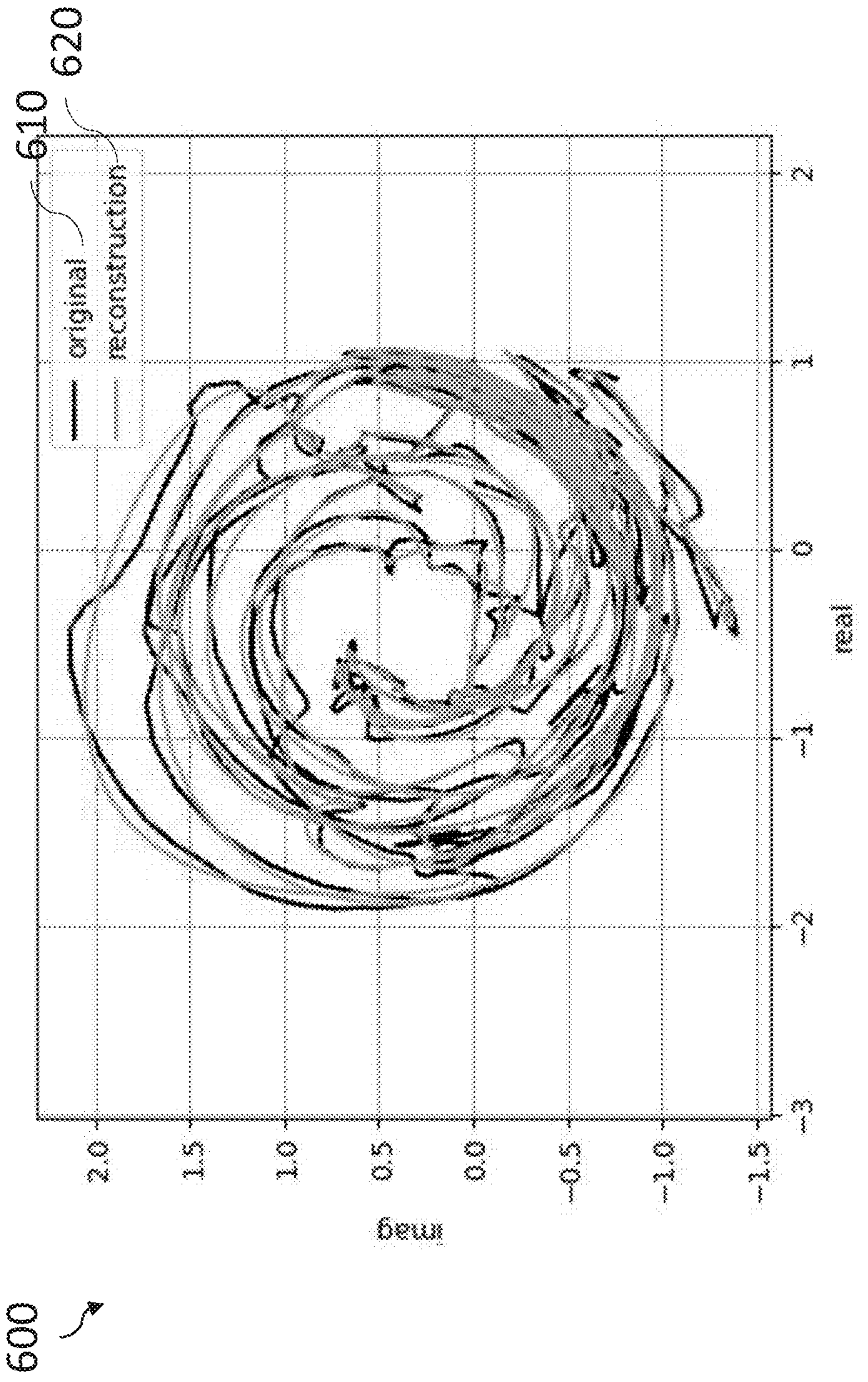

FIG. 6*a* and FIG. 6*b* illustrate examples of a polar representation 600 of complex samples of the radar receive signal 610 (original signal) and a reconstructed signal 620 for the time intervals 60 to 90 seconds and 120 to 150 seconds, respectively. The reconstructed signal 620 is an approximation of a signal model of the breathing motion based on the radar receive signal 610, which is an approximation found based on the dictionary of atoms that represent the breathing and orthogonal matching pursuit.

Figure 7A:
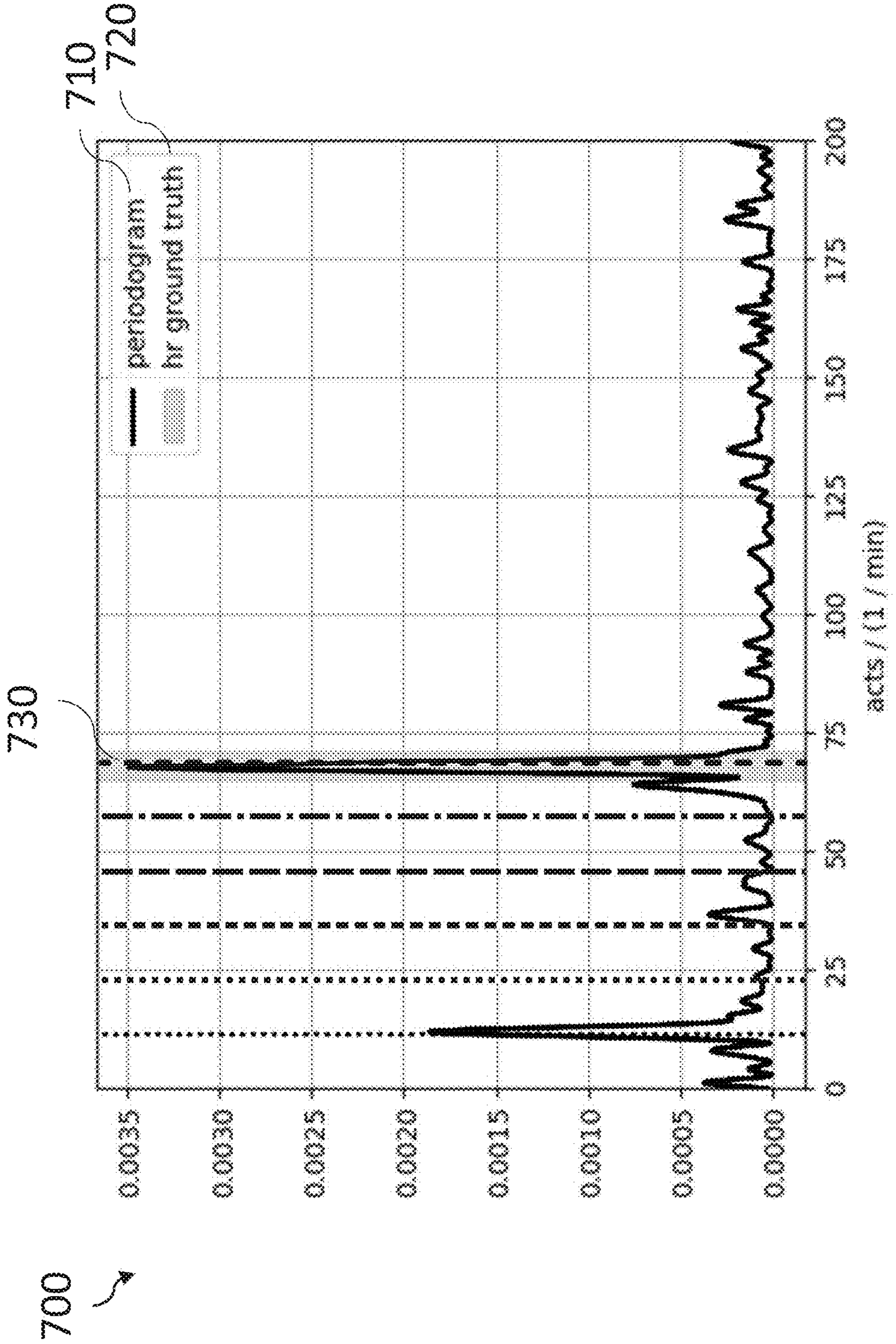
FIG. 7*a* and FIG. 7*b* illustrate examples of a periodogram of a residual signal.
Figure 7B:
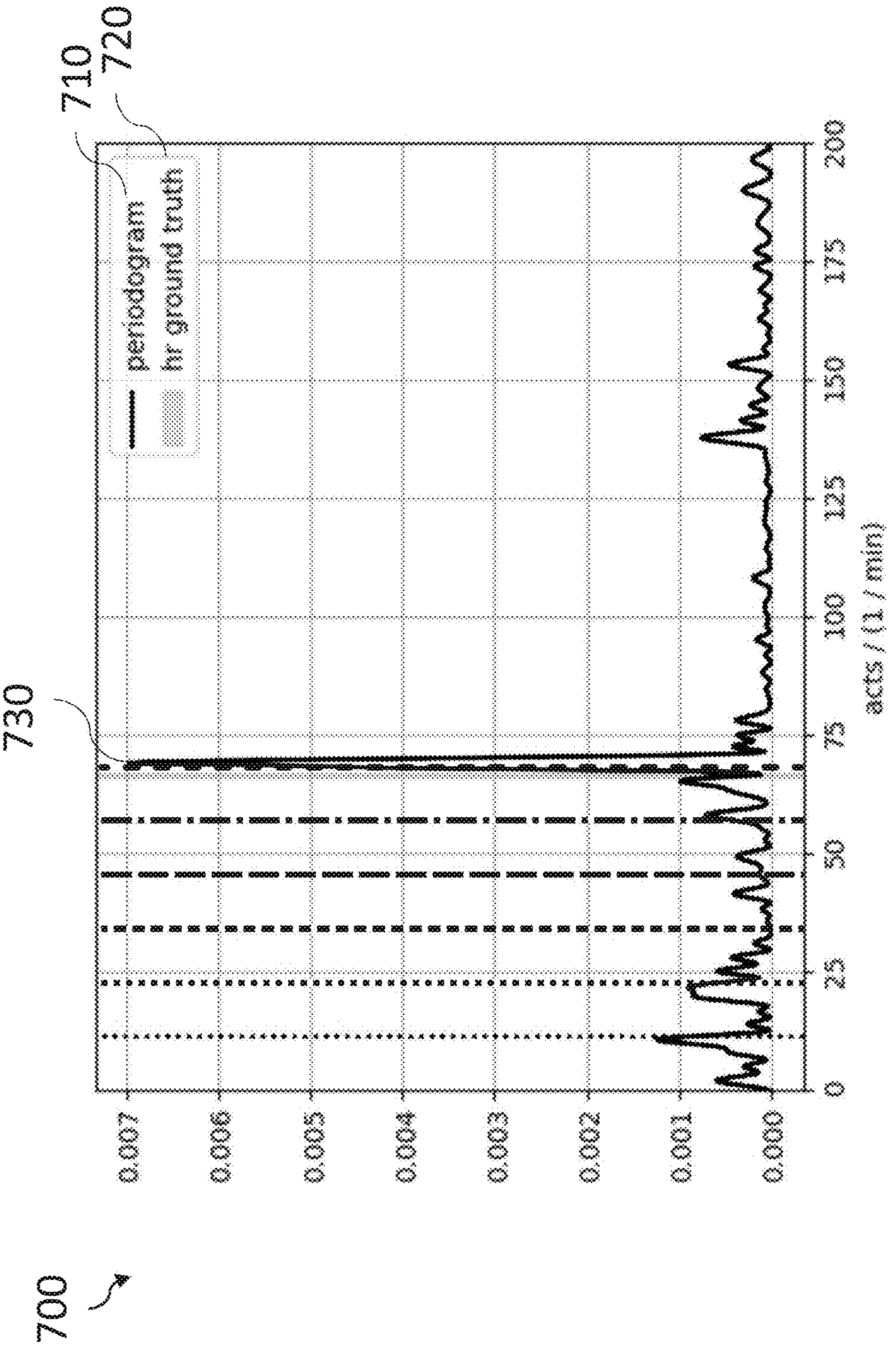

FIG. 7*a* and FIG. 7*b* illustrate examples of a diagram 700 including a periodogram 710 of a residual signal derived by subtracting the reconstructed signal 620 from the radar receive signal 610 of FIG. 6*a* and FIG. 6*b*, respectively. In the diagram 700, the ground truth of the heart rate 720 is marked. The most pronounced peak 730 in the periodogram 710 is close to the heart rate 720.

Figure 8A:
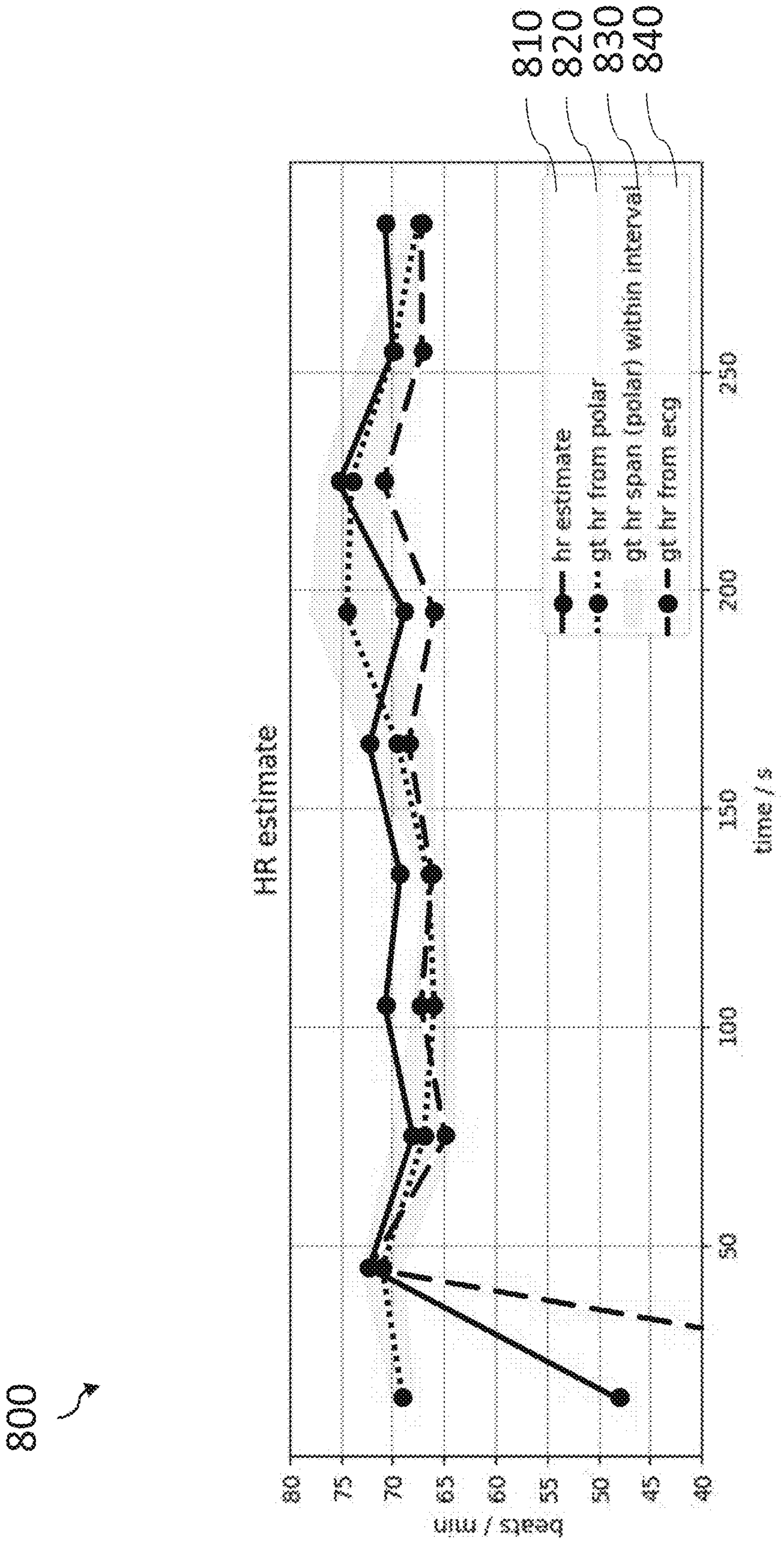
FIG. 8*a* and FIG. 8*b* illustrate an example of a diagram of a heart rate estimate over time and an example of an error of the heart rate estimate over time compared to ground truth.
Figure 8B:
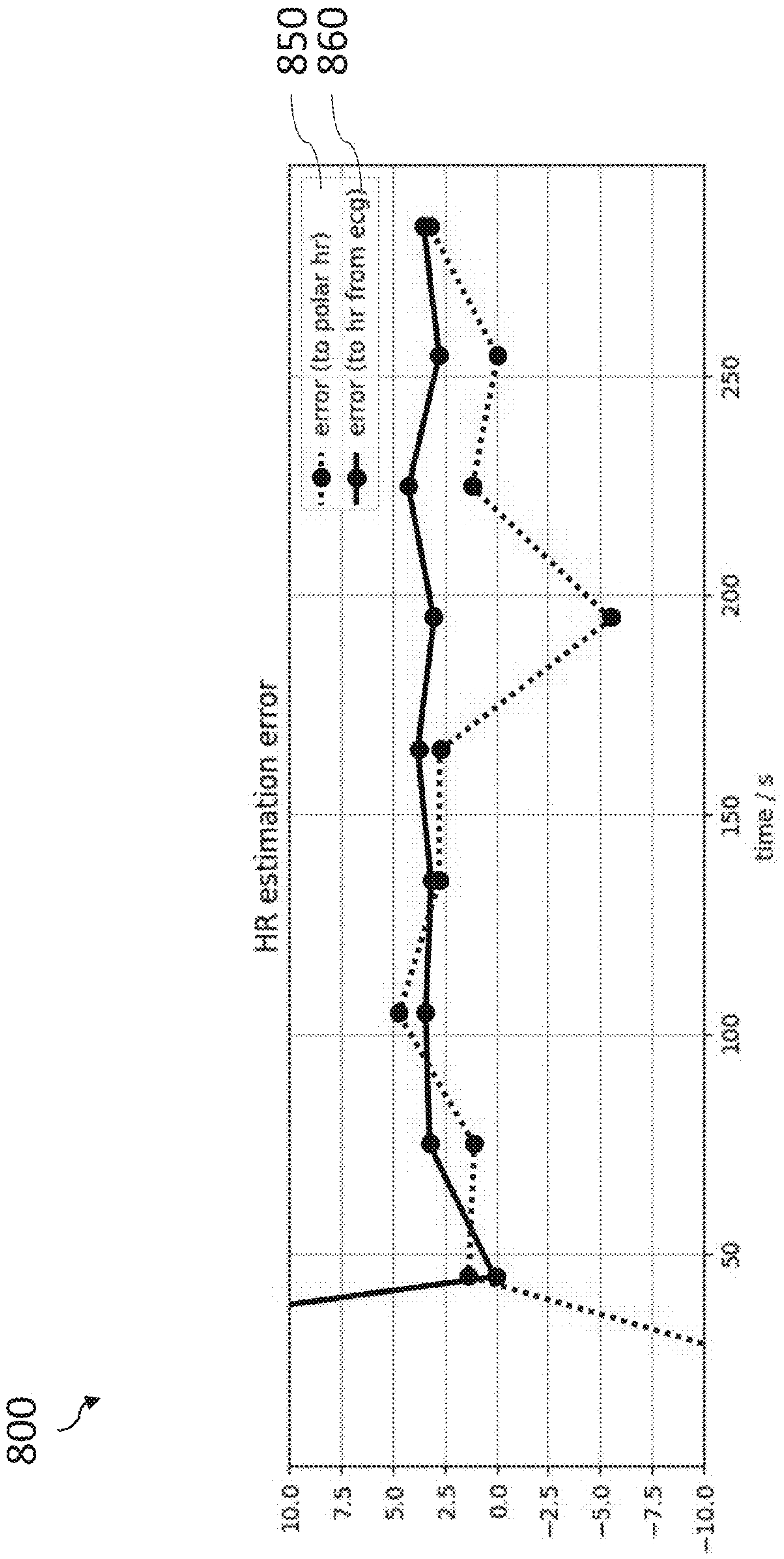

FIG. 8*a* illustrates an example of a diagram 800 of a heart rate estimate 810 over time derived from a residual signal as described above and ground truth of the heart rate 820-840 from different measurements, e.g., ECG (electrocardiography) measurements. FIG. 8*b* illustrates an example of a diagram 800 of an error 850 and 860 of the heart rate estimate 810 over time compared to the ground truth heart rate 820 and 840, respectively.

The apparatus 100 may allow an extraction of a low-amplitude signal such as a heart beat signal that would otherwise be superimposed by a much stronger displacement due to a high-amplitude signal such as a breathing motion.

Figure 9:
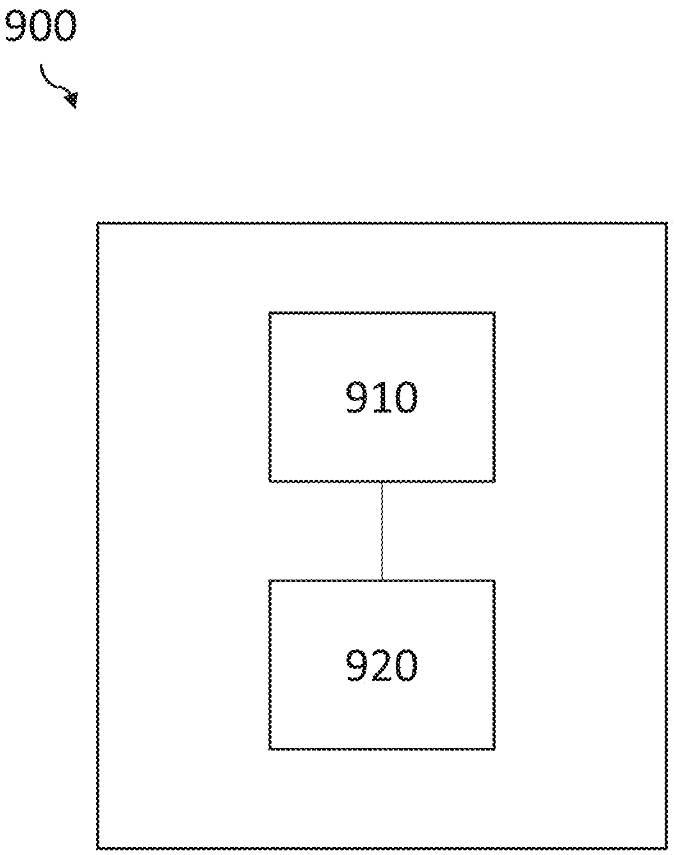
FIG. 9 illustrates an example of a radar system.

FIG. 9 illustrates an example of a radar system 900. The radar system 900 comprises an apparatus 910 as described herein, such as apparatus 100, and the radar sensor 920. The radar sensor 920 may be, e.g., a FMCW (frequency-modulated continuous-wave) radar. The radar sensor 920 is configured to generate the radar receive signal by emitting a radar emit signal to the field of view of the radar sensor 920 and receiving a reflection of the radar emit signal. The radar sensor 920 may, for instance, have only one channel by which the reflection is received.

Although the apparatus 910 and the radar sensor 920 are depicted as separate blocks in FIG. 9, in other examples, the apparatus 910 may in part or in entirety be included in the radar sensor 920, which thus correspondingly includes all or part of the processing circuitry (e.g., processing circuitry 110) of the apparatus 910.

In case the apparatus 910 is only partially included in the radar sensor 920, the radar system 900 may include distributed processing circuitry carrying out respective parts of the processing steps, e.g., in the form of first processing (sub-) circuitry included in the radar sensor 920, and second processing (sub-) circuitry external to the sensor and in communication with the first processing circuitry through interface circuitry (e.g., interface circuitry 120), for instance, for exchange of data between the first and the second processing circuitry.

In case the apparatus 910 is integrated in the radar sensor 920, the processing circuitry and the radar sensor 920 may be jointly integrated in a single semiconductor chip, or in more than one semi-conductor chip.

In case the apparatus 910 is not included in the radar sensor 920, the processing circuitry may take the form of circuitry external to the radar sensor 920, and may be communicatively coupled therewith through interface circuitry.

The radar system 900 may, for instance, be integrated into an electronic device together with control circuitry configured to control an operation of the electronic device based on the determined low-amplitude signal component. The electronic device may be any device with a sensing, e.g., ranging, function. The electronic device may be, e.g., a consumer device or medical device for, e.g., sensing vital signs of a living being. For instance, the electronic device may be integrated into a smart watch or a patient surveillance device. The control circuitry may control the operation of the electronic device, e.g., by activating or deactivating a certain function of the electronic device based on the determined low-amplitude signal component, e.g., a certain function may be activated if it is determined that a heart rate of a monitored user of the electronic device exceeds a certain threshold. For instance, the control circuitry may, if it is determined that the threshold is exceeded (thus, the heart rate is too high, too low or irregular), automatically output a warning signal, e.g., to a device of medical personnel.

More details and aspects of the radar system 900 are explained in connection with the proposed technique or one or more examples described above, e.g., with reference to FIG. 1. The radar system 900 may comprise one or more additional optional features corresponding to one or more aspects of the proposed technique, or one or more examples described above.

The radar system 900 may allow an extraction of a low-amplitude signal such as a heart beat signal that would otherwise be superimposed by a much stronger displacement due to a high-amplitude signal such as a breathing motion.

Figure 10:
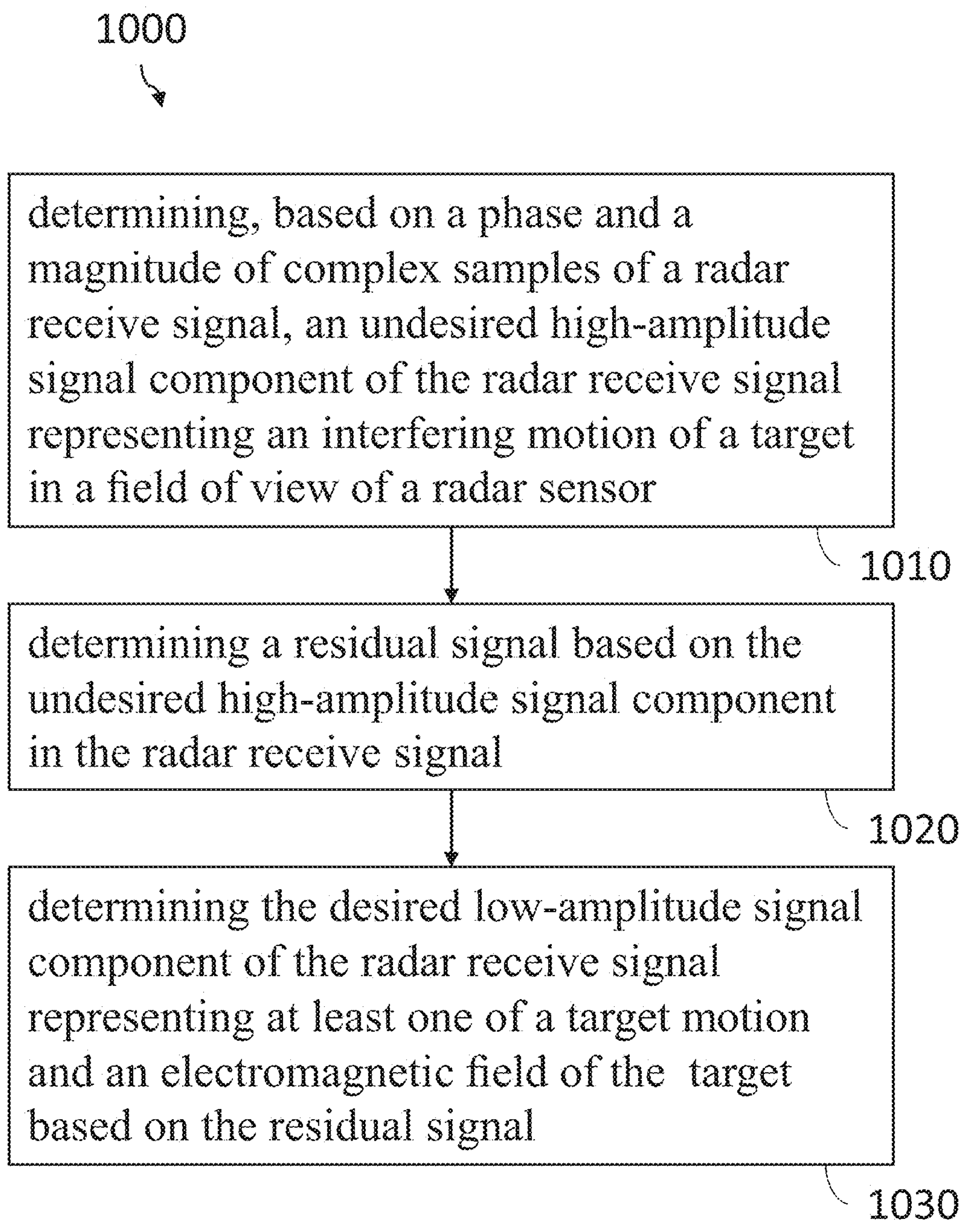
FIG. 10 illustrates an example of a method.

FIG. 10 illustrates a flowchart of an example of a computer-implemented method 1000 for determining a desired low-amplitude signal component of a radar receive signal of a radar sensor. The method 1000 may, for instance, be performed by an apparatus as described herein such as apparatus 100. The method 1000 comprises determining 1010, based on a phase and a magnitude of complex samples of the radar receive signal, an undesired high-amplitude signal component of the radar receive signal representing an interfering motion of a target in a field of view of the radar sensor, determining 1020 a residual signal based on the undesired high-amplitude signal component and the radar receive signal and determining 1030 the desired low-amplitude signal component of the radar receive signal representing at least one of a target motion and an electromagnetic field of the target based on the residual signal.

More details and aspects of the method 1000 are explained in connection with the proposed technique or one or more examples described above, e.g., with reference to FIG. 1. The method 1000 may comprise one or more additional optional features corresponding to one or more aspects of the proposed technique, or one or more examples described above.

The method 1000 may allow an extraction of a low-amplitude signal such as a heart beat signal that would otherwise be superimposed by a much stronger displacement due to a high-amplitude signal such as a breathing motion.

Figure 11:
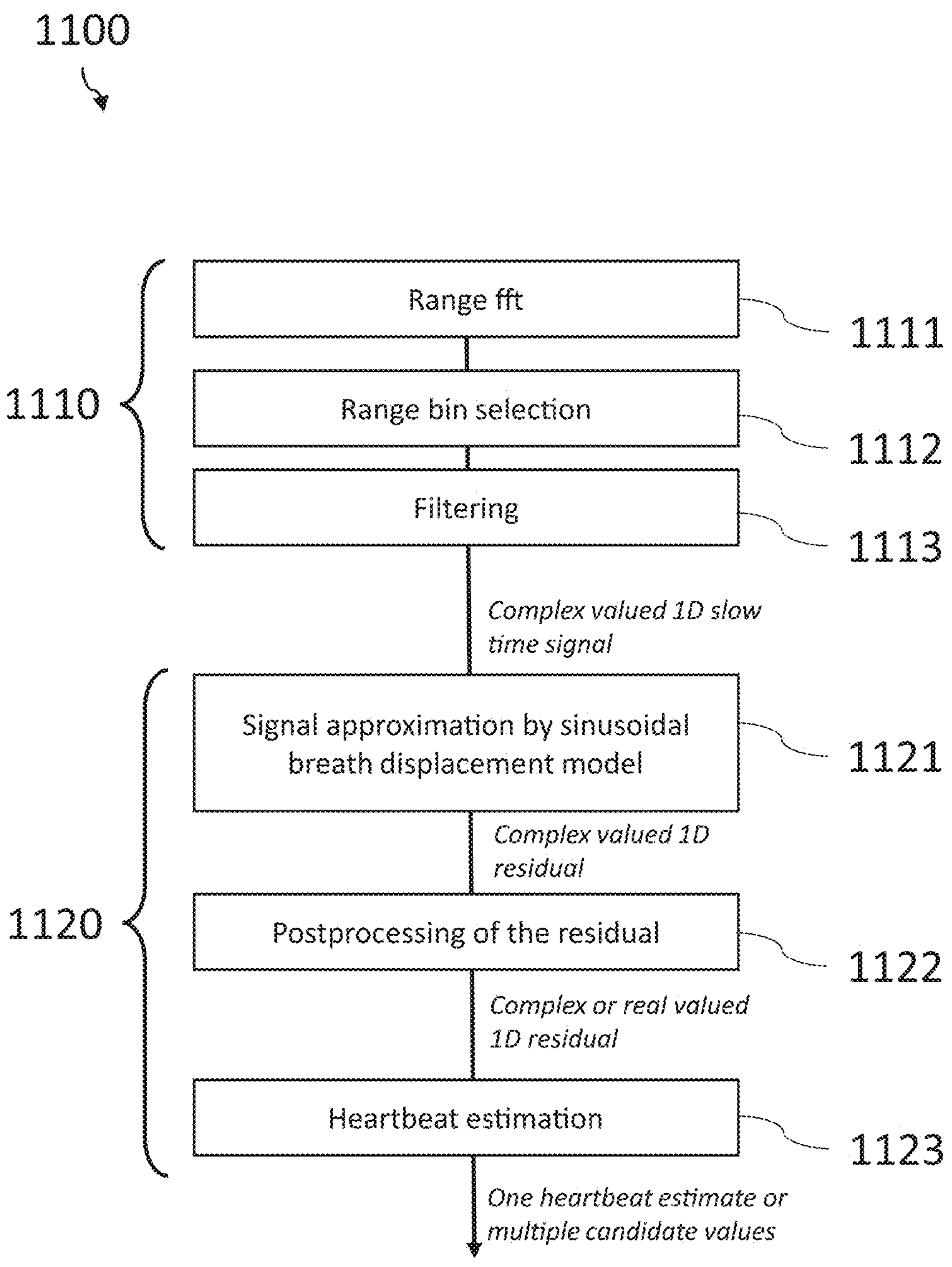
FIG. 11 illustrates another example of a method.

FIG. 11 illustrates a flowchart of another example of a method 1100 for determining a desired low-amplitude signal component of a radar receive signal of a radar sensor. The method 1100 may be performed by an apparatus as described herein such as apparatus 100. The method 1100 comprises a preprocessing sub-method 1110 and a processing sub-method 1120. The preprocessing sub-method 1110 comprises determining 1111 a range representation of a radar receive signal of a radar sensor by applying an FFT to the radar receive signal. The preprocessing sub-method 1110 further comprises selecting 1112 range bins of interest from the range representation, and filtering 1113 the selected range bins.

The processing sub-method 1120 comprises determining, based on a phase and a magnitude of complex samples of the radar receive signal, an undesired high-amplitude signal component of the radar receive signal representing an interfering motion of a target in a field of view of the radar sensor, In the example of FIG. 11, determining the undesired high-amplitude signal component comprises approximating 1121 the undesired high-amplitude signal to a phase and a magnitude of complex samples of the radar receive signal, e.g., based on a signal model capable of representing a first harmonic of breath displacements in the radar receive signal. The approximated signal may mainly fit the breathing signature. An output of approximating 1121 may be a complex valued residual signal. For instance, the method 1100 may comprise determining the residual signal based on the undesired high-amplitude signal component and the radar receive signal, e.g., by determining a difference between the radar receive signal and the approximation, which substantially rejects the breathing signal and makes the heart beat more visible.

The processing sub-method 1120 further comprises postprocessing 1122 the residual signal. For example, postprocessing 1122 may comprise determining an absolute value or a square of an absolute value of the residual signal.

The processing sub-method 1120 further comprises determining 1123 a desired low-amplitude signal component of the radar receive signal representing at least one of a target motion and an electromagnetic field of the target based on the residual signal. In the example of FIG. 11, the desired low-amplitude signal component indicates a heart beat of a target in the field of view of the radar sensor. For example, the heart rate may be extracted from the postprocessed residual signal. Optionally, the method 1100 may comprise determining a plurality of candidate low-amplitude signal components and select a plausible low-amplitude signal component from the plurality of candidates.

The method 1100 may allow an extraction of a low-amplitude signal such as a heart beat signal that would otherwise be superimposed by a much stronger displacement due to a high-amplitude signal such as a breathing motion.

In the following, some examples of the proposed technique are presented:

An example (e.g., example 1) relates to an apparatus for determining a desired low-amplitude signal component of a radar receive signal of a radar sensor, comprising processing circuitry configured to determine, based on a phase and a magnitude of complex samples of the radar receive signal, an undesired high-amplitude signal component of the radar receive signal representing an interfering motion of a target in a field of view of the radar sensor, determine a residual signal based on the undesired high-amplitude signal component and the radar receive signal, and determine the desired low-amplitude signal component of the radar receive signal representing at least one of a target motion and an electromagnetic field of the target based on the residual signal.

Another example (e.g., example 2) relates to a previous example (e.g., example 1) or to any other example, further comprising that the processing circuitry is configured to determine the residual signal by attenuating the undesired high-amplitude signal component in the radar receive signal.

Another example (e.g., example 3) relates to a previous example (e.g., one of the examples 1 or 2) or to any other example, further comprising that the interfering motion is a breathing motion of the target.

Another example (e.g., example 4) relates to a previous example (e.g., one of the examples 1 to 3) or to any other example, further comprising that the at least one of the target motion and the electromagnetic field indicates a heart beat of the target.

Another example (e.g., example 5) relates to a previous example (e.g., example 4) or to any other example, further comprising that the processing circuitry is further configured to determine at least one of a heart rate and a blood pressure of the target based on the desired low-amplitude signal component.

Another example (e.g., example 6) relates to a previous example (e.g., one of the examples 1 to 5) or to any other example, further comprising that the processing circuitry is configured to determine the undesired high-amplitude signal component by determining a phase and a magnitude of the undesired high-amplitude signal component based on the phase and the magnitude of the complex samples.

Another example (e.g., example 7) relates to a previous example (e.g., example 6) or to any other example, further comprising that the processing circuitry is configured to determine the undesired high-amplitude signal component by determining a plurality of phases and a plurality of magnitudes of the undesired high-amplitude signal component based on the phase and the magnitude of the complex samples, wherein the plurality of phases and the plurality of magnitudes correspond to respective patches of the target.

Another example (e.g., example 8) relates to a previous example (e.g., one of the examples 1 to 7) or to any other example, further comprising that the processing circuitry is configured to determine the undesired high-amplitude signal component based on a signal model modelling the undesired high-amplitude signal as a combination of a plurality of signal components of the receive signal received from respective patches of the target.

Another example (e.g., example 9) relates to a previous example (e.g., example 8) or to any other example, further comprising that the signal model models the undesired high-amplitude signal component as a combination of at least 3 signal components of the receive signal received from respective patches of the target.

Another example (e.g., example 10) relates to a previous example (e.g., one of the examples 1 to 9) or to any other example, further comprising that the processing circuitry is configured to determine the undesired high-amplitude signal component by determining at least a first harmonic of the interfering motion based on the complex samples.

Another example (e.g., example 11) relates to a previous example (e.g., one of the examples 1 to 10) or to any other example, further comprising that the processing circuitry is configured to determine the undesired high-amplitude signal component by approximating the undesired high-amplitude signal to the phase and the magnitude of the complex samples based on at least one of a predefined span of an amplitude of the undesired high-amplitude signal component, a predefined span of a phase of the undesired high-amplitude signal component and an estimate of an angular frequency of the undesired high-amplitude signal component.

Another example (e.g., example 12) relates to a previous example (e.g., example 11) or to any other example, further comprising that the processing circuitry is configured to determine the estimate of the angular frequency based on the phase of the complex samples.

Another example (e.g., example 13) relates to a previous example (e.g., example 12) or to any other example, further comprising that the processing circuitry is configured to determine the estimate of the angular frequency by determining a peak of the phase of the complex samples.

Another example (e.g., example 14) relates to a previous example (e.g., one of the examples 11 to 13) or to any other example, further comprising that the processing circuitry is configured to determine the estimate of the angular frequency based on at least one of a numerical optimization and a cost function using a power of the residual signal as a cost.

Another example (e.g., example 15) relates to a previous example (e.g., example 14) or to any other example, further comprising that the processing circuitry is configured to determine the estimate of the angular frequency by minimizing a cost function using the power of the residual signal as the cost.

Another example (e.g., example 16) relates to a previous example (e.g., one of the examples 1 to 15) or to any other example, further comprising that the processing circuitry is configured to determine the undesired high-amplitude signal component by approximating a signal model of the interfering motion to the phase and the magnitude of the complex samples.

Another example (e.g., example 17) relates to a previous example (e.g., example 16) or to any other example, further comprising that the signal model is represented by at least one atom, and wherein processing circuitry is configured to approximate the signal model to the complex samples based on the at least one atom.

Another example (e.g., example 18) relates to a previous example (e.g., one of the examples 16 or 17) or to any other example, further comprising that the signal model is represented by a dictionary of a plurality of atoms, and wherein processing circuitry is configured to approximate the signal model to the complex samples by selecting at least one atom of the plurality of atoms.

Another example (e.g., example 19) relates to a previous example (e.g., example 18) or to any other example, further comprising that the processing circuitry is configured to approximate the signal model to the complex samples by applying an orthogonal matching pursuit to the dictionary.

Another example (e.g., example 20) relates to a previous example (e.g., one of the examples 18 or 19) or to any other example, further comprising that the processing circuitry is configured to determine the plurality of atoms based on respective parameters for an inhale phase and an exhale phase of the breathing motion.

Another example (e.g., example 21) relates to a previous example (e.g., one of the examples 18 to 20) or to any other example, further comprising that the processing circuitry is configured to determine the plurality of atoms by equally spacing respective amplitude values of the plurality of atoms within a predefined span of an amplitude modulating the undesired high-amplitude signal component.

Another example (e.g., example 22) relates to a previous example (e.g., one of the examples 18 to 21) or to any other example, further comprising that the processing circuitry is configured to determine the plurality of atoms by equally spacing respective phase values of the plurality of atoms within a predefined span of a phase modulating the undesired high-amplitude signal component.

Another example (e.g., example 23) relates to a previous example (e.g., one of the examples 1 to 22) or to any other example, further comprising that the processing circuitry is configured to determine an absolute value or a square of an absolute value of the residual signal, and determine the desired low-amplitude signal component based on the absolute value or the square of the absolute value of the residual signal.

Another example (e.g., example 24) relates to a previous example (e.g., one of the examples 1 to 23) or to any other example, further comprising that the processing circuitry is configured to determine a phase and a magnitude of the residual signal, and determine the desired low-amplitude signal component based on the phase and the magnitude of the residual signal.

Another example (e.g., example 25) relates to a previous example (e.g., one of the examples 1 to 24) or to any other example, further comprising that the processing circuitry is configured to determine the desired low-amplitude signal component by determining at least one peak of a spectrum of the residual signal.

Another example (e.g., example 26) relates to a previous example (e.g., example 25) or to any other example, further comprising that the processing circuitry is configured to determine the at least one peak of the spectrum of the residual signal within a predefined frequency span.

Another example (e.g., example 27) relates to a previous example (e.g., one of the examples 25 or 26) or to any other example, further comprising that the processing circuitry is configured to, in response to determining a plurality of peaks of the spectrum of the residual signal, determine the desired low-amplitude signal by selecting a peak of the plurality of peaks based on a previously determined desired low-amplitude signal component of the radar receive signal.

Another example (e.g., example 28) relates to a previous example (e.g., one of the examples 1 to 27) or to any other example, further comprising that the processing circuitry is configured to dynamically update the desired low-amplitude signal component by applying a tracking algorithm to the radar receive signal.

Another example (e.g., example 29) relates to a previous example (e.g., one of the examples 1 to 28) or to any other example, further comprising that the processing circuitry is configured to determine the low-amplitude signal component by applying a stitching method to the residual signal.

Another example (e.g., example 30) relates to a previous example (e.g., one of the examples 1 to 29) or to any other example, further comprising that the processing circuitry is further configured to determine an error in the determination of the desired low-amplitude signal component based on at least one of a power of the residual signal, an amplitude of a peak of a spectrum of the residual signal and a deviation of the determined desired low-amplitude signal component from a previously determined desired low-amplitude signal component of the radar receive signal.

Another example (e.g., example 31) relates to a previous example (e.g., one of the examples 1 to 30) or to any other example, further comprising that the processing circuitry is further configured to output a signal to a user based on the determined desired low-amplitude signal component.

An example (e.g., example 32) relates to a radar system, comprising the apparatus of a previous example (e.g., examples 31) or to any other example, and the radar sensor, wherein the radar sensor is configured to generate the radar receive signal by emitting a radar emit signal to the field of view of the radar sensor and receiving a reflection of the radar emit signal.

An example (e.g., example 33) relates to a computer-implemented method for determining a desired low-amplitude signal component of a radar receive signal of a radar sensor, comprising determining, based on a phase and a magnitude of complex samples of the radar receive signal, an undesired high-amplitude signal component of the radar receive signal representing an interfering motion of a target in a field of view of the radar sensor, determining a residual signal based on the undesired high-amplitude signal component in the radar receive signal, and determining the desired low-amplitude signal component of the radar receive signal representing at least one of a target motion and an electromagnetic field of the target based on the residual signal.

Another example (e.g., example 34) relates to a non-transitory machine-readable medium having stored thereon a program having a program code for performing the method according to a previous example (e.g., example 33) or to any other example, when the program is executed on a processor or a programmable hardware.

Another example (e.g., example 35) relates to a program having a program code for performing the method according to a previous example (e.g., example 33) or to any other example, when the program is executed on a processor or a programmable hardware.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method, comprising:

determining, based on a phase and a magnitude of complex samples of a radar receive signal, an undesired high-amplitude signal component of the radar receive signal representing an interfering motion of a target in a field of view of a radar sensor, determining the undesired high-amplitude signal component comprising:

selecting, from a dictionary of a plurality of atoms, at least one atom, wherein each atom of the dictionary of the plurality of atoms represents a parameterized waveform of the interfering motion of the target, and the plurality of atoms correspond to respective combinations of values of a displacement amplitude and a phase offset within predefined spans of the displacement amplitude and the phase offset, and generating a reconstructed interference signal by combining the selected at least one atom;

determining a residual signal by attenuating the undesired high-amplitude signal component of the radar receive signal based on the reconstructed interference signal;

determining a desired low-amplitude signal component of the radar receive signal representing at least one of a target motion or an electromagnetic field of the target based on the residual signal; and controlling an operation of an electronic device based on the determined desired low-amplitude signal component.

2. The method of claim 1, wherein the interfering motion is a breathing motion of the target.

3. The method of claim 1, wherein the at least one of the target motion or the electromagnetic field indicates a heart beat of the target.

4. The method of claim 3, further comprising determining at least one of a heart rate or a blood pressure of the target based on the desired low-amplitude signal component.

5. The method of claim 1, wherein determining the undesired high-amplitude signal component comprises determining a phase and a magnitude of the undesired high-amplitude signal component based on the phase and the magnitude of the complex samples.

6. The method of claim 1, wherein determining the undesired high-amplitude signal component comprises determining at least a first harmonic of the interfering motion based on the complex samples.

7. The method of claim 1, wherein determining the undesired high-amplitude signal component comprises approximating the undesired high-amplitude signal component to the phase and the magnitude of the complex samples based on at least one of a predefined span of an amplitude of the undesired high-amplitude signal component, a predefined span of a phase of the undesired high-amplitude signal component or an estimate of an angular frequency of the undesired high-amplitude signal component.

8. The method of claim 7, further comprising determining the estimate of the angular frequency based on at least one of a numerical optimization or a cost function using a power of the residual signal as a cost.

9. The method of claim 1, wherein determining the undesired high-amplitude signal component comprises approximating a signal model of the interfering motion to the phase and the magnitude of the complex samples.

10. The method of claim 9, wherein the signal model is represented by the dictionary of the plurality of atoms, and the method further comprises approximating the signal model to the complex samples by selecting at least one atom of the plurality of atoms.

11. The method of claim 10, wherein approximating the signal model to the complex samples comprises applying an orthogonal matching pursuit to the dictionary.

12. The method of claim 10, further comprising determining the plurality of atoms based on respective parameters for an inhale phase and an exhale phase of a breathing motion.

13. The method of claim 1, further comprising:

determining an absolute value or a square of an absolute value of the residual signal; and determining the desired low-amplitude signal component based on the absolute value or the square of the absolute value of the residual signal.

14. An apparatus comprising a processor, and a memory with instructions stored thereon, wherein the instructions, when executed by the processor, enable the apparatus to perform the steps of:

determining, based on a phase and a magnitude of complex samples of a radar receive signal, an undesired high-amplitude signal component of the radar receive signal representing an interfering motion of a target in a field of view of a radar sensor, determining the undesired high-amplitude signal component comprising:

selecting, from a dictionary of a plurality of atoms, at least one atom, wherein each atom of the dictionary of the plurality of atoms represents a parameterized waveform of the interfering motion of the target, and the plurality of atoms correspond to respective combinations of values of a displacement amplitude and a phase offset within predefined spans of the displacement amplitude and the phase offset, and generating a reconstructed interference signal by combining the selected at least one atom;

determining a residual signal by attenuating the undesired high-amplitude signal component of the radar receive signal based on the reconstructed interference signal;

determining a desired low-amplitude signal component of the radar receive signal representing at least one of a target motion or an electromagnetic field of the target based on the residual signal; and controlling an operation of an electronic device based on the determined low-amplitude signal component.

15. The apparatus of claim 14, wherein the instructions, when executed by the processor, further enable the apparatus to perform the step of:

determining at least one of a heart rate or a blood pressure of the target based on the desired low-amplitude signal component.

16. The apparatus of claim 14, wherein determining the undesired high-amplitude signal component comprises determining a phase and a magnitude of the undesired high-amplitude signal component based on the phase and the magnitude of the complex samples.

17. The apparatus of claim 14, wherein determining the undesired high-amplitude signal component comprises determining at least a first harmonic of the interfering motion based on the complex samples.

18. The apparatus of claim 14, wherein determining the undesired high-amplitude signal component comprises approximating the undesired high-amplitude signal component to the phase and the magnitude of the complex samples based on at least one of a predefined span of an amplitude of the undesired high-amplitude signal component, a predefined span of a phase of the undesired high-amplitude signal component or an estimate of an angular frequency of the undesired high-amplitude signal component.

19. A radar system, comprising:

the apparatus of claim 14; and the radar sensor, wherein the radar sensor is configured to generate the radar receive signal by emitting a radar emit signal to the field of view of the radar sensor and receiving a reflection of the radar emit signal.

20. An apparatus comprising processing circuitry configured to:

determine, based on a phase and a magnitude of complex samples of a radar receive signal, an undesired high-amplitude signal component of the radar receive signal representing an interfering motion of a target in a field of view of a radar sensor, wherein the undesired high-amplitude signal component is determined by:

selecting, from a dictionary of a plurality of atoms, at least one atom, wherein each atom of the dictionary of the plurality of atoms represents a parameterized waveform of the interfering motion of the target, and the plurality of atoms correspond to respective combinations of values of a displacement amplitude and a phase offset within predefined spans of the displacement amplitude and the phase offset, and generating a reconstructed interference signal by combining the selected at least one atom;

determine a residual signal by attenuating the undesired high-amplitude signal component of the radar receive signal based on the reconstructed interference signal;

determine a desired low-amplitude signal component of the radar receive signal representing at least one of a target motion or an electromagnetic field of the target based on the residual signal; and control an operation of an electronic device based on the determined desired low-amplitude signal component.

* * * * *